United States Patent [19]
Sato

[11] Patent Number: 5,940,954
[45] Date of Patent: Aug. 24, 1999

[54] APPARATUS FOR PRODUCING MOLDED ARTICLE AND METHOD THEREFOR

[75] Inventor: Toshiomi Sato, Fujinomiya, Japan

[73] Assignee: Kabushiki Kaisya Sato Seiki, Fujinomiya, Japan

[21] Appl. No.: 08/638,983

[22] Filed: Apr. 25, 1996

[30] Foreign Application Priority Data

Nov. 27, 1995 [JP] Japan .................................... 7-332700

[51] Int. Cl.$^6$ ..................................................... B29F 1/10
[52] U.S. Cl. .............................. 29/565; 29/335; 425/122; 425/125; 425/126.1; 425/129.1
[58] Field of Search .................................. 29/417, 527.1, 29/33 Q, 33 R, 33 S, 565, 856, 563; 425/129.1, 122, 126.1, 308, 315, 125

[56] References Cited

U.S. PATENT DOCUMENTS

| | | | |
|---|---|---|---|
| 3,380,145 | 4/1968 | Stroud et al. | 29/417 X |
| 3,470,598 | 10/1969 | Berthelsen | 29/417 X |
| 3,510,933 | 5/1970 | Taylor et al. | 29/417 |
| 3,568,247 | 3/1971 | Lunn | 425/129.1 |
| 3,743,458 | 7/1973 | Hallauer et al. | 425/122 |
| 4,345,889 | 8/1982 | Sizemore et al. | 425/122 |
| 4,531,276 | 7/1985 | Warwick et al. | 29/417 |
| 4,818,205 | 4/1989 | Burke et al. | 425/129.1 X |
| 5,199,157 | 4/1993 | Kurz et al. | 29/527.1 X |
| 5,359,761 | 11/1994 | Whitson et al. | 425/129.1 |
| 5,405,255 | 4/1995 | Neu | 425/125 X |
| 5,560,881 | 10/1996 | Hillman et al. | 29/527.1 X |
| 5,608,957 | 3/1997 | Hanagan | 29/527.1 X |

FOREIGN PATENT DOCUMENTS

| | | | |
|---|---|---|---|
| 56-82218 | 7/1981 | Japan | 425/122 |
| 619260 | 3/1949 | United Kingdom | 425/129.1 |

*Primary Examiner*—Joseph M. Gorski
*Attorney, Agent, or Firm*—Oliff & Berridge, PLC

[57] ABSTRACT

An apparatus for producing a molded article from a sheet material is provided which comprises: a press working section, including a stationary plate and a movable plate oppositely disposed relative to one another, for performing a press working operation when the movable plate is closed; an insert molding section, including a stationary die and a movable die oppositely disposed relative to one another, for performing an insert molding operation; a shearing section, including a die plate and a punch plate oppositely disposed relative to one another, for performing a shearing operation; the press working section, the insert molding section and the shearing section being arranged in series; the sheet material being transported through a first area defined by the opposed stationary and movable plates, a second area defined by the opposed stationary and movable dies, and a third area defined by the opposed die and punch plates; the press working operation relative to a portion of the sheet material disposed oppositely to the press working section, the insert molding operation relative to a portion of the sheet material disposed oppositely to the insert molding section, and the shearing operation relative to a portion of the sheet material disposed oppositely to the shearing section being performed in a synchronous manner.

4 Claims, 25 Drawing Sheets

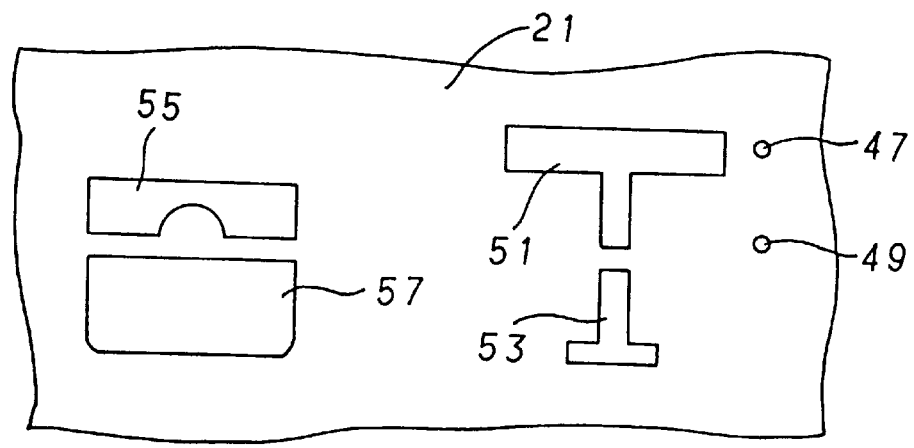
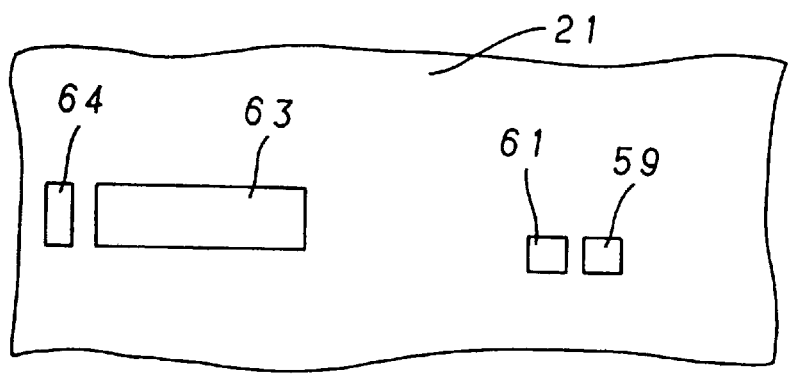
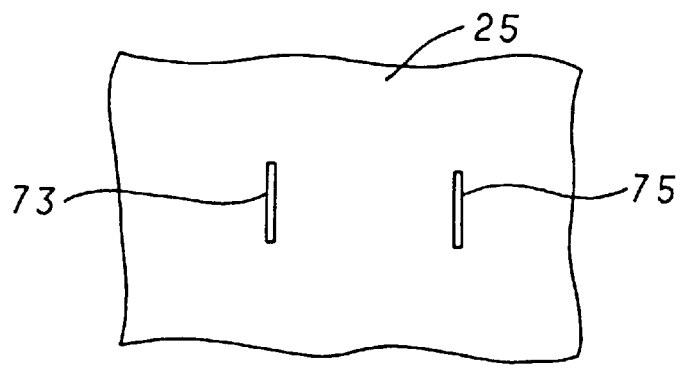

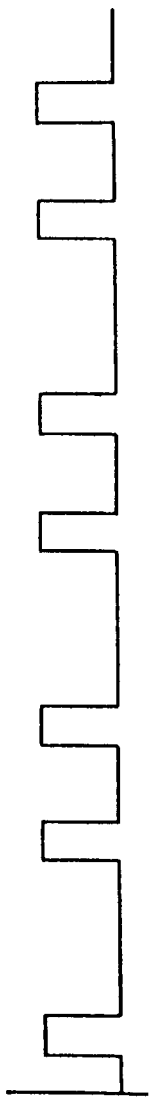
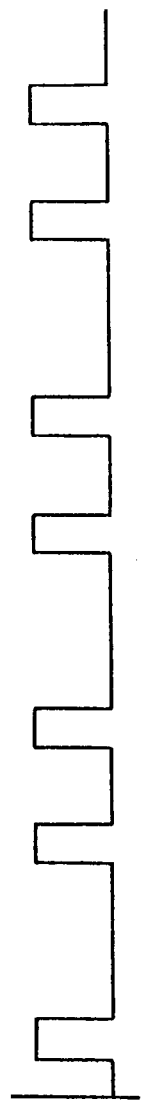
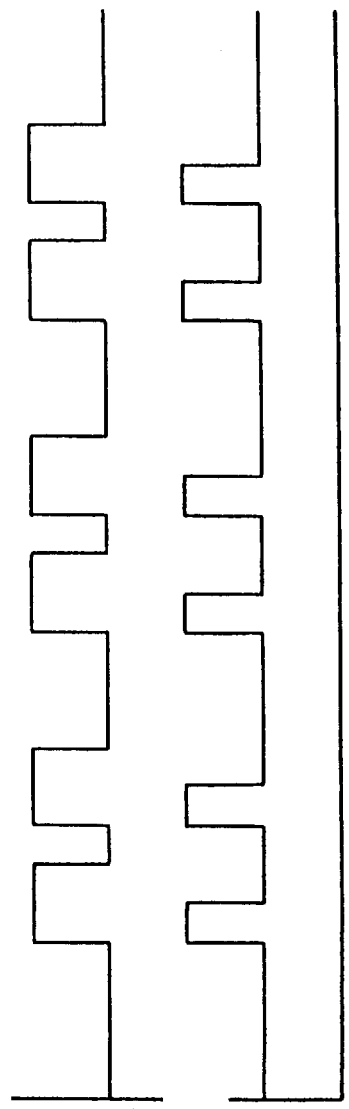
FIG. 35A  PRESS WORKING
FIG. 35B  INSERT MOLDING
FIG. 35C  SHEARING
FIG. 35D  TRANSPORTATION OF SHEET MATERIAL
FIG. 35E  OPERATION OF STATIONARY DIE
TIME

APPARATUS FOR PRODUCING MOLDED ARTICLE AND METHOD THEREFOR

BACKGROUND OF THE INVENTION

1. Field of the Invention

This invention relates to an apparatus and method for producing a molded article such as household electrical ware parts or automobile parts. More particularly, the invention relates to an apparatus and method for performing a press working operation, an insert molding operation and a shearing operation in a synchronous manner, to produce a molded article.

2. Description of the Prior Art

When a molded article is produced using a press device, a stationary plate is closed relative to a movable plate so as to perform a press working operation relative to a metal sheet, whereby the sheet material may be cut or deformed plastically into a predetermined shape. Such a press working operation is continuously performed relative to the sheet material The sheet material on which the press working operation has been performed is severed to produce an intermediate article. Such an intermediate article is transferred for example by an operator to an insert molding machine and then manually supplier to the insert molding machine. A plastic resin is charged into a cavity so as to perform an insert molding operation, to produce a molding or molded article in which the intermediate article of metal and plastic are integrated.

SUMMARY OF THE INVENTION

It is noted that, in the above-mentioned prior art, the press working operation, the insert molding operation and the shearing operation are separately performed in different devices. Thus, intermediate articles, which have been obtained by press working a sheet material and severing it, must be brought to an insert molding machine and supplied manually into the insert molding machine. This inhibits manufacturing and raises costs.

In order to eliminate the problems experienced in the prior art, the invention is aimed at the provision of an apparatus and method for producing a molded article which permits significant increase in manufacturing efficiency and reduction in production cost.

According to the invention, there is provided an apparatus for producing a molded article from a sheet material comprising:

a press working section, including a stationary plate and a movable plate oppositely disposed relative to one another, for performing a press working operation when said movable plate is closed;

an insert molding section, including a stationary die and a movable die oppositely disposed relative to one another, for performing an insert molding operation when said movable die is closed;

a shearing section, including a die plate and a punch plate oppositely disposed relative to one another, for performing a shearing operation when said punch plate is closed;

said press working section, said insert molding section and said shearing section being arranged in series;

said sheet material being transported through a first area defined by said opposed stationary and movable plates, a second area defined by said opposed stationary and movable dies, and a third area defined by said opposed die and punch plates;

the press working operation relative to a portion of said sheet material disposed oppositely to said press working section, the insert molding operation relative to a portion of said sheet material disposed oppositely to said insert molding section, and the shearing operation relative to a portion of said sheet material disposed oppositely to said shearing section being performed in a synchronous manner.

According to the invention, there is provided a method for performing a press working operation, an insert molding operation, and a shearing operation in order to produce a molded article, wherein said press working operation, said insert molding operation and said shearing operation are performed in a synchronous manner.

According to the invention, there is also provided a method for producing a molded article comprising:

a first step for feeding, by a predetermined pitch, a sheet material having a plurality of working portions successively formed therein to a first area defined by a stationary plate and a movable plate which are oppositely disposed so as to form a press working section, a second area defined by a stationary die and a movable die which are oppositely disposed to as to form an insert molding section, and a third area defined by a die plate and a punch plate which are oppositely disposed so as to form a shearing section;

a synchronous processing step for performing a press working operation relative to a working portion of said sheet material opposed to said press working section, an insert molding operation relative to a working portion of said sheet material opposed to said insert molding section for forming a molding thereon, and shearing operation relative to a working portion of said sheet material opposed to said shearing section for severing the molding from said working portion in a synchronous manner, with a plurality of working portions being greater in number than the working portions to be processed in said press working section and in said shearing section are processed in terms of insert molding;

a second step for feeding said sheet material by a predetermined pitch when said synchronous processing step has been completed;

a withdrawal step for moving at least one of said stationary die and said movable die to a position in which, even when said movable die is closed, it is not in contact with the molding which has been formed in said synchronous processing step and which is positioned opposite to said second area;

a synchronous press working/shearing step for performing the press working operation relative to the working portion of said sheet material opposed to said press working section in synchronous with performing the shearing operation for severing the molding which has been formed during said synchronous processing step from the working portion of said sheet material opposed to said shearing section;

a third step for feeding said sheet material by a predetermined pitch, so as to place the working portion which has not been formed with a molding at said second area; and a step for returning at least one of said stationary die and said movable die which has been moved in said withdrawal step to a position in which insert molding operation may be carried out.

BRIEF DESCRIPTION OF THE DRAWINGS

FIG. 3 is a plan view illustrating a portion of a movable die of the apparatus for producing a molded article according to the first embodiment of the invention;

FIG. 4 is a plan view illustrating a portion of a movable die of the apparatus for producing a molded article according to the first embodiment of the invention;

FIG. 5 is a plan view illustrating a portion of a punch plate of the apparatus for producing a molded article according to the first embodiment of the invention;

FIG. 35 is a time chart illustrating operation of the apparatus for producing a molded article according to the second embodiment of the invention.

DETAILED DESCRIPTION OF PREFERRED EMBODIMENTS

A first embodiment according to the invention will be explained below with reference to FIGS. 1 through 17.

Figure 1:
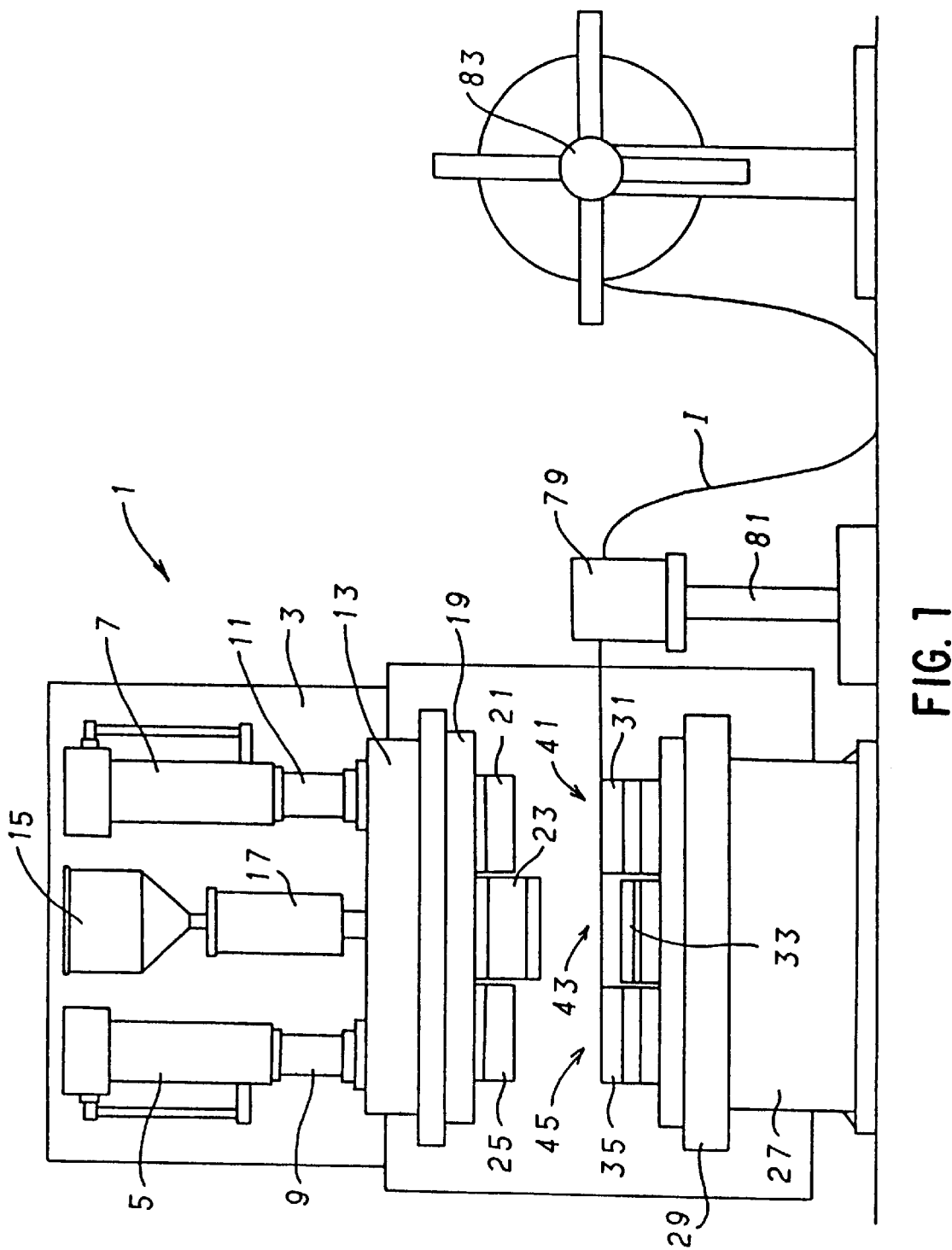
FIG. 1 is a front view illustrating an apparatus for producing a molded article according to a first embodiment of the invention.
Figure 2:
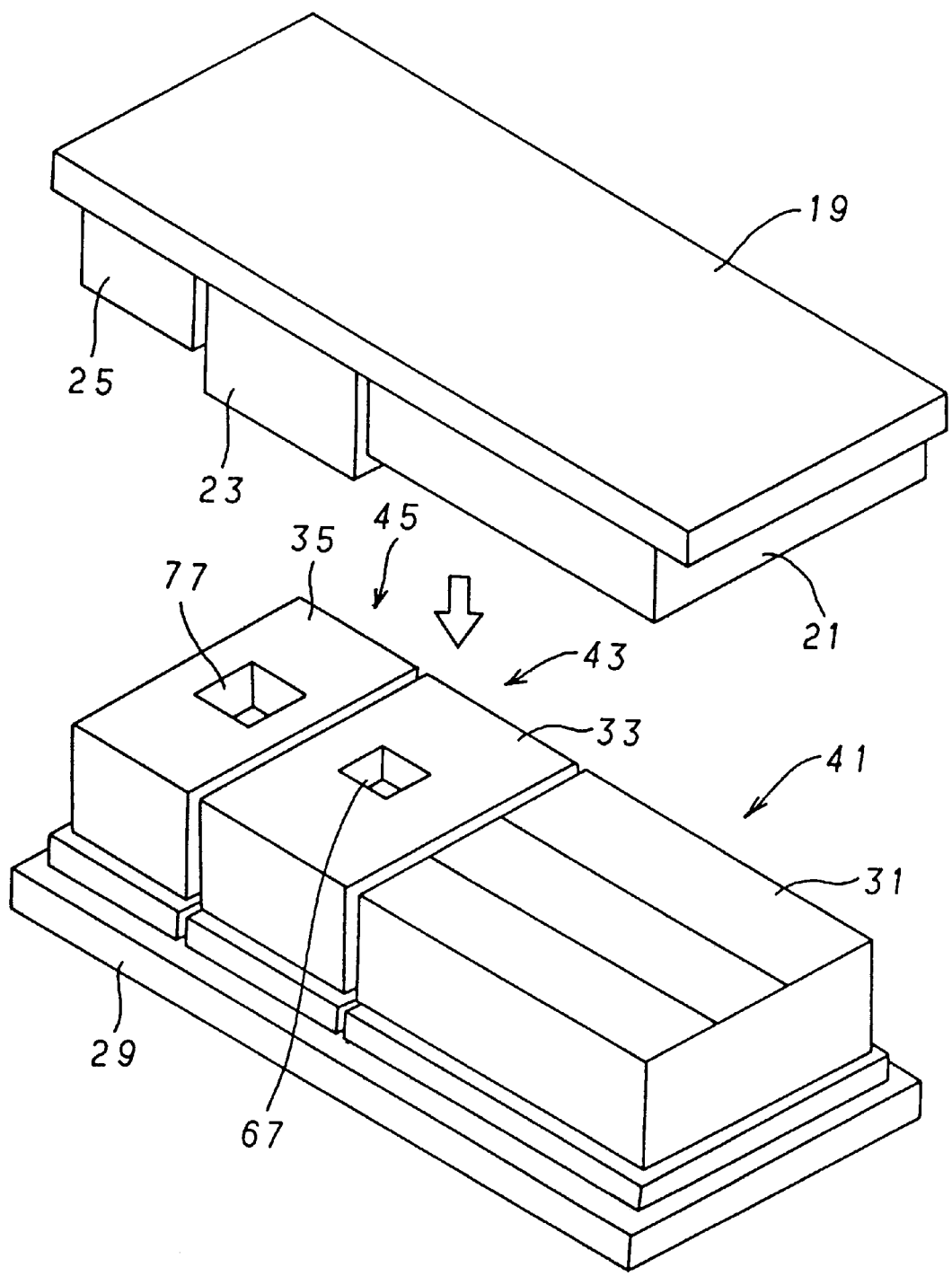
FIG. 2 is a perspective view illustrating a main portion of the apparatus for producing a molded article according to the first embodiment of the invention.

An apparatus 1 for producing a molded article according to the first embodiment of the invention is illustrated in FIG. 1.

In this drawing, reference numeral 3 designates a body of the apparatus. A pair of cylinders 5 and 7 are disposed at the upper portion of the apparatus body 3. A ram 9 of the cylinder 5 and a ram 11 of the cylinder 7 are connected to the upper surface of a movable base 13.

A hopper 15, as well as a heating cylinder 17 connected to the hopper 15, is disposed between the cylinder 5 and the cylinder 7. The lower end of the heating cylinder 17 is extended into the movable base 13.

An attachment base 19 is secured to the movable base 13 at its lower surface. A movable plate 21, a movable die 23 and a punch plate 25 are mounted on the attachment base at its lower surface.

Reference numeral 27 designates a base plate. A stationary base 29 is secured to the base plate 28 at its upper surface. A movable plate 31, a stationary die 33 and a die plate 35 are mounted on the stationary base 39 at its upper surface.

A press working section 41 is constituted by the movable plate 21 and the stationary plate 31, while a insert molding section 43 is constituted by the movable die 23 and the stationary die 33. A shearing section is constituted by the punch plate 25 and the die plate 35.

As shown in FIG. 3, blanking punches 47, 49, 51 and 53 are provided on the movable plate 21. Blanking punches 55 and 57 are also provided on the movable plate 21 at a respective position spaced from the above blanking punches by a predetermined distance. Folding punches 59 and 61 are also provided on the movable plate 21, as shown in FIG. 4. Further blanking punches 63 and 64 are also provided on the movable plate 21 at a respective position spaced from the folding punches by a predetermined distance, as shown in FIG. 4.

The stationary plate 31 has formed therein a plurality of apertures corresponding to the blanking punches 47, 49, 51, 52, 53, 55, 57, 63 and 64 on the movable plate 21. The above apertures are in communication with a chute (not shown).

The stationary plate 31 has also formed therein a plurality of apertures corresponding to the folding punches 59 and 61 on the movable plate 21.

A recess 66 is formed in the movable die 23 at its lower surface. The recess 66 is in communication with a runner 65. The runner 65 is connected to the lower end of the heating cylinder 17(see FIGS. 12 through 15).

The stationary die 33 has formed therein a recess 67. Reference numeral 71 designates a push-up pin. The push-up pin 71 may be actuated between a position in which it is protruded from the lower surface of the recess 67 and a position in which it is flushed, at its forward end, with the bottom of the recess 67.

The stationary die 33 is adapted to be movable in a direction toward and away from the movable die 23 by means of a hydraulic stationary drive unit. The stationary drive unit is adapted to be operable in sequence with the actuation of the rams 9 and 11.

As shown in FIG. 5, the punch plate 25 is provided with cutters 73 and 75. The die plate 35 has formed therein a recess 77 corresponding to the cutters 73 and 75. The recess 77 is in communication with a chute (not shown).

Lifter pins 84, 85, 87, 89, 91, 93 and 95 are provided at the sides of the stationary plate 31, the stationary die 33 and the die plate 35. The above lifter pins are adapted to be operable between a position in which they protrude from the respective upper surfaces of the stationary plate 31, the stationary die 33 and the die plate 35 and a position in which they are entirely received within the respective plates and die.

Reference numeral 79 designates a device for transporting a continuous length of metal sheet I to an area defined by the opposed stationary plate 31 and the movable plate 21, an area defined by the opposed stationary die 33 and the movable die 23, and an area defined by the opposed die plate 35 and the punch plate 25.

The metal sheet transportation device 79 is supported by an elevator device 81. The elevator device 81 is adapted to be operable in sequence with the operation of the rams 9 and 11.

Reference numeral 83 designates a support device for metal sheet. The metal sheet support device 83 has the continuous length of metal sheet I, being wound in a rolled configuration, around its rotatable shaft. When the rotatable shaft is rotated, the continuous length of metal sheet I is fed to the metal sheet transportation device 79.

Operation of the apparatus for producing an molded article will be explained below.

When the rotatable shaft of the metal sheet support device 83 is driven, the metal sheet I in a rolled configuration is supplied or fed forwardly. The metal sheet I is further supplied, due to the actuation of the metal sheet transportation device 79, to the area between the stationary plate 31 and the movable plate 21, the area between the stationary die 33 and the movable die 23, and the area between the die plate 35 and the punch plate 25. Then, the metal sheet is stopped and supported by the lifter pins 84, 85, 87, 89, 91, 93 and 95.

Figure 6:
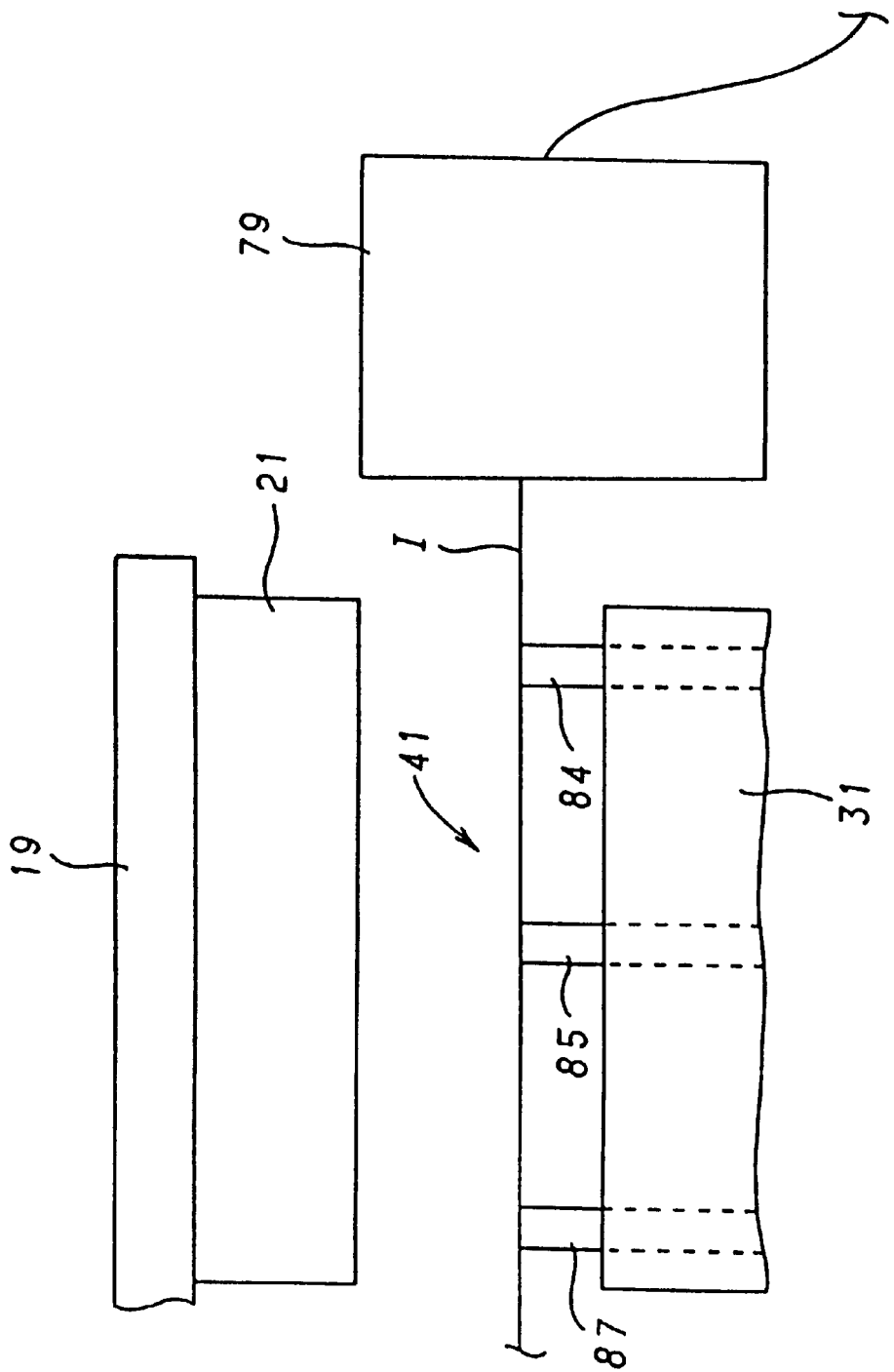
FIG. 6 is a front view illustrating a vertical operational movement of a metal sheet transportation device mounted on the apparatus for producing a molded article according to the first embodiment of the invention.

As shown in FIG. 6, when the movable plate 21, the movable die 23 and the punch plate 25 are in their open positions, the sheet metal transportation device 79 is held at its home position of a predetermined height, so that a gap of a predetermined distance is formed as between the metal sheet and the upper surface of the movable plate 31.

Then, the rams 9 and 11 are actuated, so as to cause the movable plate 21, the movable die 23 and the punch plate 25, together with the movable base 13 and the attachment base 19, to be lowered to their closed positions relative to the stationary plate 31, the stationary die 32 and the die plate 35. As the movable plate 21, the movable die 23 and the punch plate 25 are closed, the lifter pins 84, 85, 87, 89, 91, 93 and 95 are lowered into the stationary plate 31, the stationary die 23 and the die plate 35 from their upper surface.

In the press working section, a press working operation is performed on the metal sheet I. In the insert molding section 43, an insert molding operation is performed to the portion of the metal sheet I to which the press working operation has been already performed. In the shearing section 45, a shearing operation is performed to the portion of the metal sheet I to which the insert molding operation has been already performed. The press working operation, the insert molding operation and the shearing operation are performed in a synchronized manner.

Figure 8:
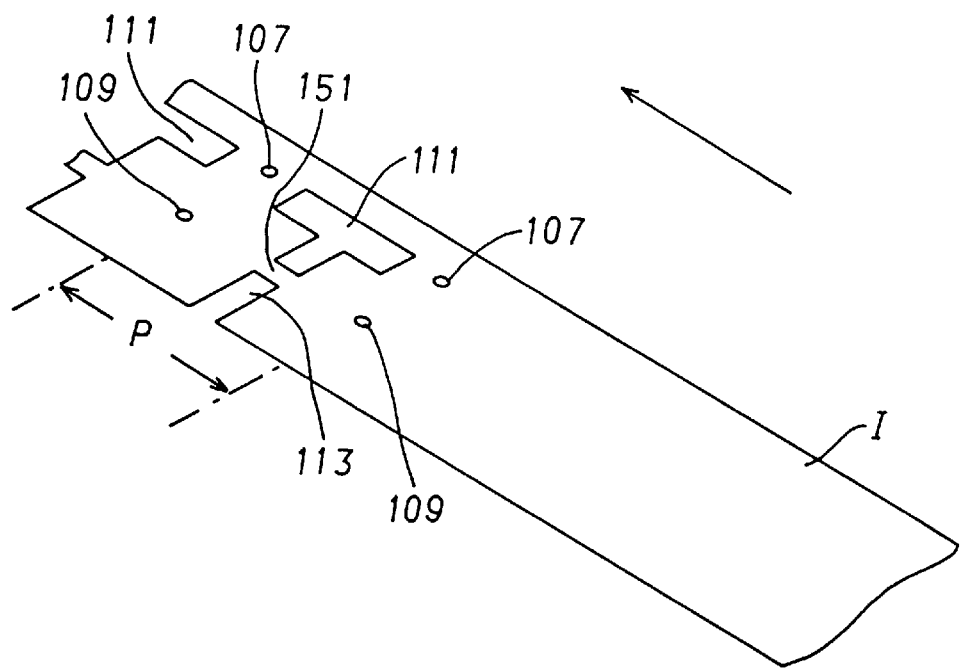
FIG. 8 is a perspective view illustrating a press working operation to be performed by the apparatus for producing a molded article according to the first embodiment of the invention.
Figure 9:
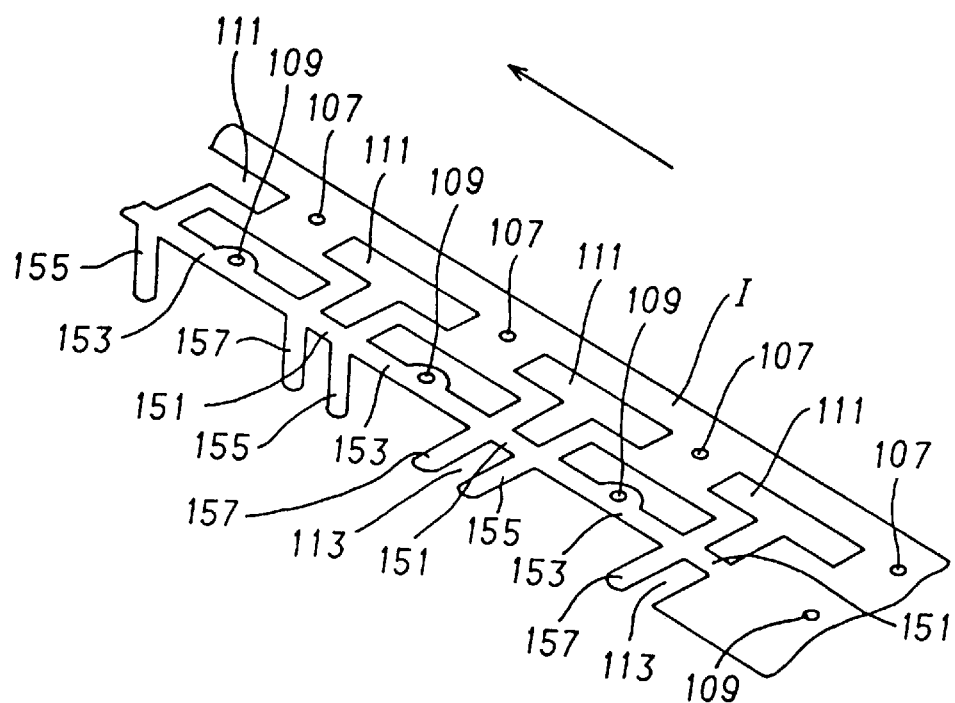
FIG. 9 is a perspective view illustrating a press working operation to be performed by the apparatus for producing a molded article according to the first embodiment of the invention.
Figure 10:
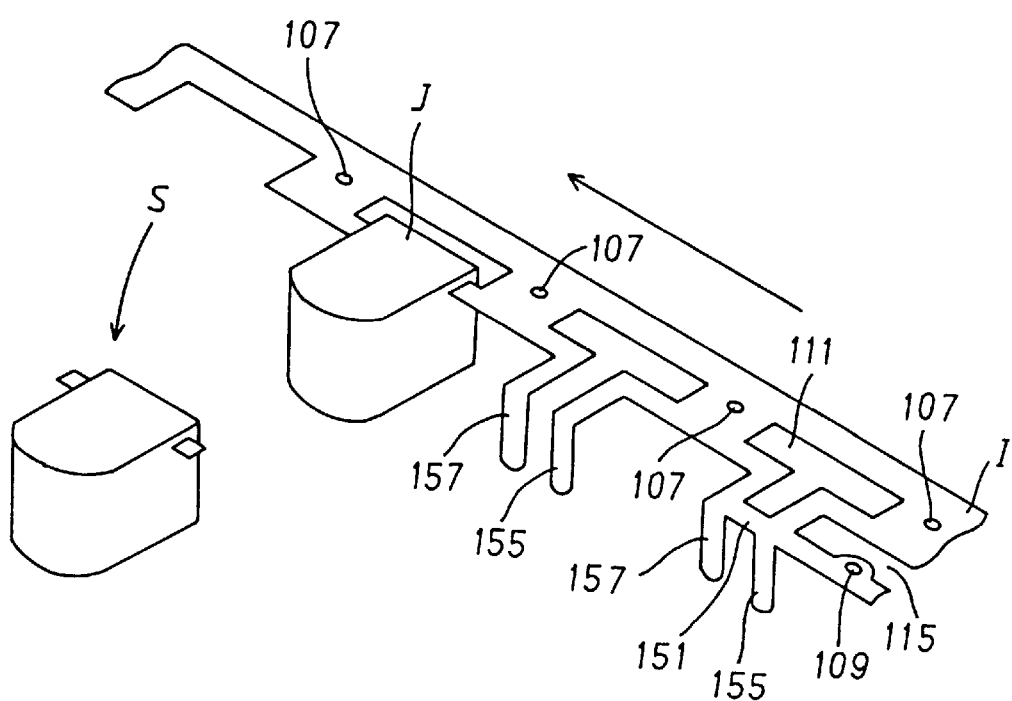
FIG. 10 is a perspective view illustrating press working, insert molding and shearing operations to be performed by the apparatus for producing a molded article according to the first embodiment of the invention.

The metal sheet I is stopped, when the press working operation, the insert molding operation and the shearing operation are to be performed. The metal sheet I is then fed by a distance P as shown in FIG. 8. The above operation will be repeated so as to continuously perform the above operations.

The elevator device 81 is actuated, synchronously with the closing operation of the movable plate 21, the movable die 23 and the punch plate 25, so that the metal sheet transportation device 79, together with the metal sheet I supported thereby, is lowered. Thus, the metal sheet I extending between the metal sheet transportation device 79 and the stationary plate 31 may be maintained in the horizontal position, even when the movable plate 21, the movable die 23 and the punch plate 25 are closed, thus preventing an excessive tension from being applied to the metal sheet.

Figure 7:
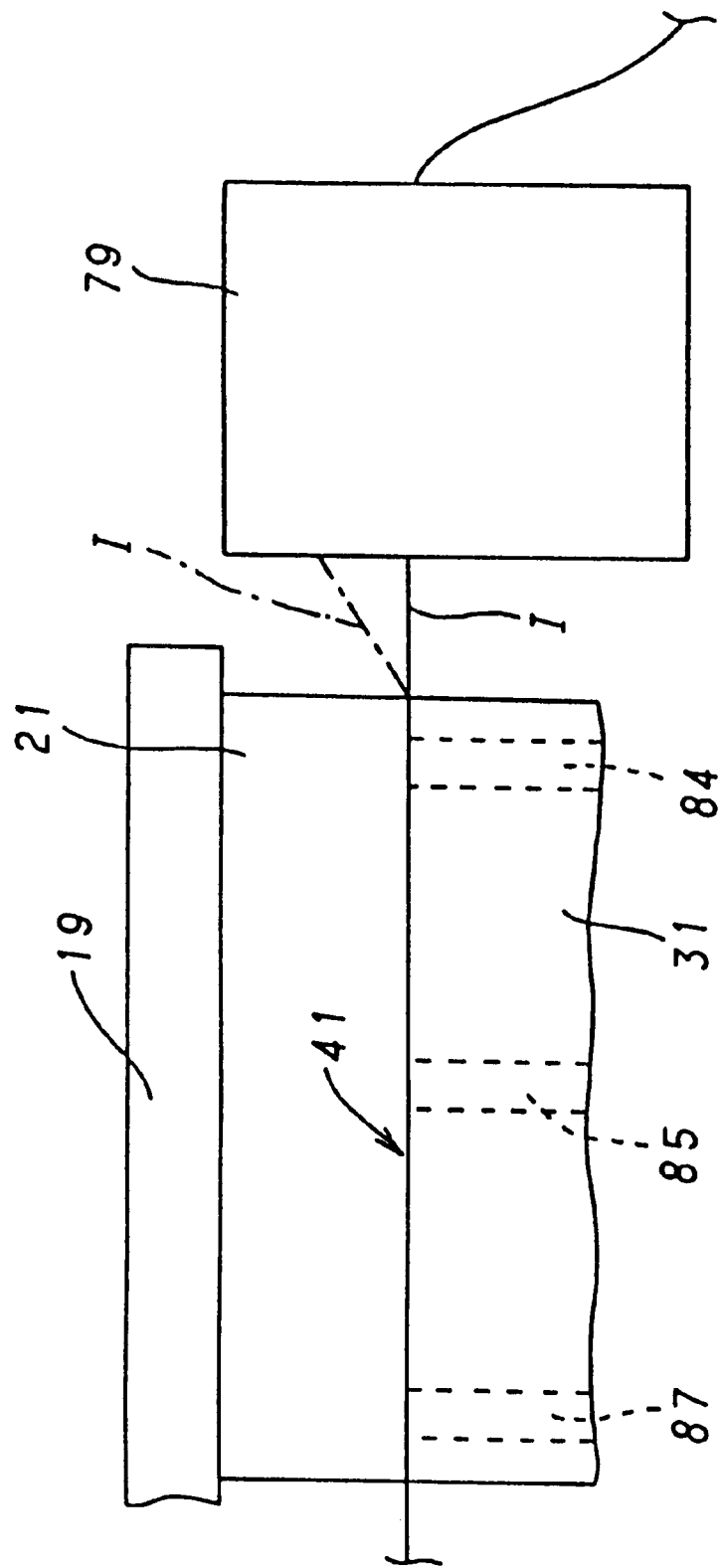
FIG. 7 is a front view illustrating a vertical operational movement of a metal sheet transportation device mounted on the apparatus for producing a molded article according to the first embodiment of the invention.

When the movable plate 21, the movable die 23 and the punch plate 25 are closed, with the metal sheet transportation device 79 being in its home position shown in FIG. 6, the metal sheet I is pulled as shown by the dotted line in FIG. 7. Thus, excessive tension is applied to the metal sheet I, which may cause rupturing of the metal sheet, or shifting or offset of the position at which the press working operation is performed.

Operation of the press working, insert molding and shearing will be explained below.

In the press working section 41, small apertures 107 and 109 of a circular configuration, a T-shaped opening 111 and a notch 113 are formed in the metal sheet I by means of blanking punches 47, 48, 51 and 53, whereby a connection portion 151 of a small dimension is formed. This process will be referred to as a "first press working operation" hereinbelow. Blanked-out pieces from the sheet metal fall into a chute (not shown).

The small, each of the circular apertures 107 and 109 is detected by a sensor (not shown) and serves as a positional reference for performing the press working, insert molding and shearing operations.

A connecting portion 153 of a large dimension and terminals 155 and 157 are formed in the metal sheet I, to which the first press working process has been performed, by means of the blanking punches 55 and 57. This process will be referred to as a "second press working operation" hereinbelow.

Blanked-out pieces from the sheet metal fall into a chute (not shown).

After completion of the first and second press working processes, the terminal 155 of the metal sheet I is folded, by means of the folding punch 59, downwardly at a right angle. This process will be referred to as a "third press working operation" hereinbelow.

After completion of the first, second and third press working operations, the terminal 157 of the metal sheet I is folded, by means of the folding punch 61, downwardly at a right angle. This process will be referred to as a "fourth press working process" hereinbelow.

After completion of the first, second, third and fourth press working processes, the metal sheet I is blanked by means of the blanking punches 63 and 64 to as to form the connection portion 150 of a small dimension and the connection portion 153 of a large dimension. This process will be referred to as a "fifth press working process" hereinbelow. Blanked-out pieces from the metal sheet fall into a chute (not shown).

When the first, second, third, fourth and fifth press working processes have been completed, the metal sheet is transferred from the press working process to the insert molding process.

In the insert molding section, a quantity of resin is charged from the heating cylinder 17 through the runner 65 into the cavity defined by the recesses 66 and 67, with the cavity receiving therein the terminals 155 and 157, whereby a resin-molded portion J is formed. When the resin becomes solidified, the movable die 23 is opened.

Figure 11:
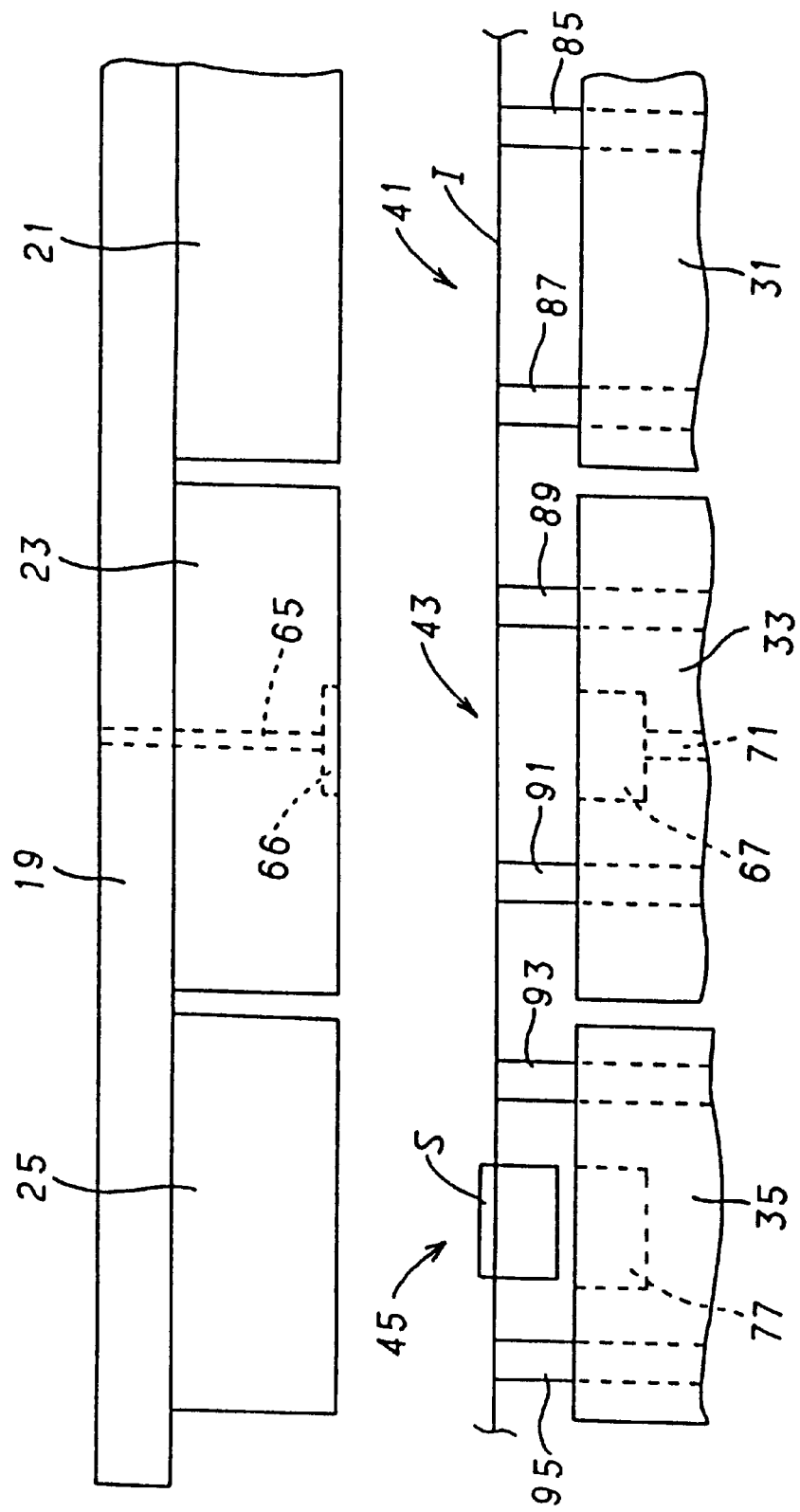
FIG. 11 is a front view of a portion of the apparatus for producing a molded article according to the first embodiment of the invention illustrating an operational movement thereof.
Figure 12:
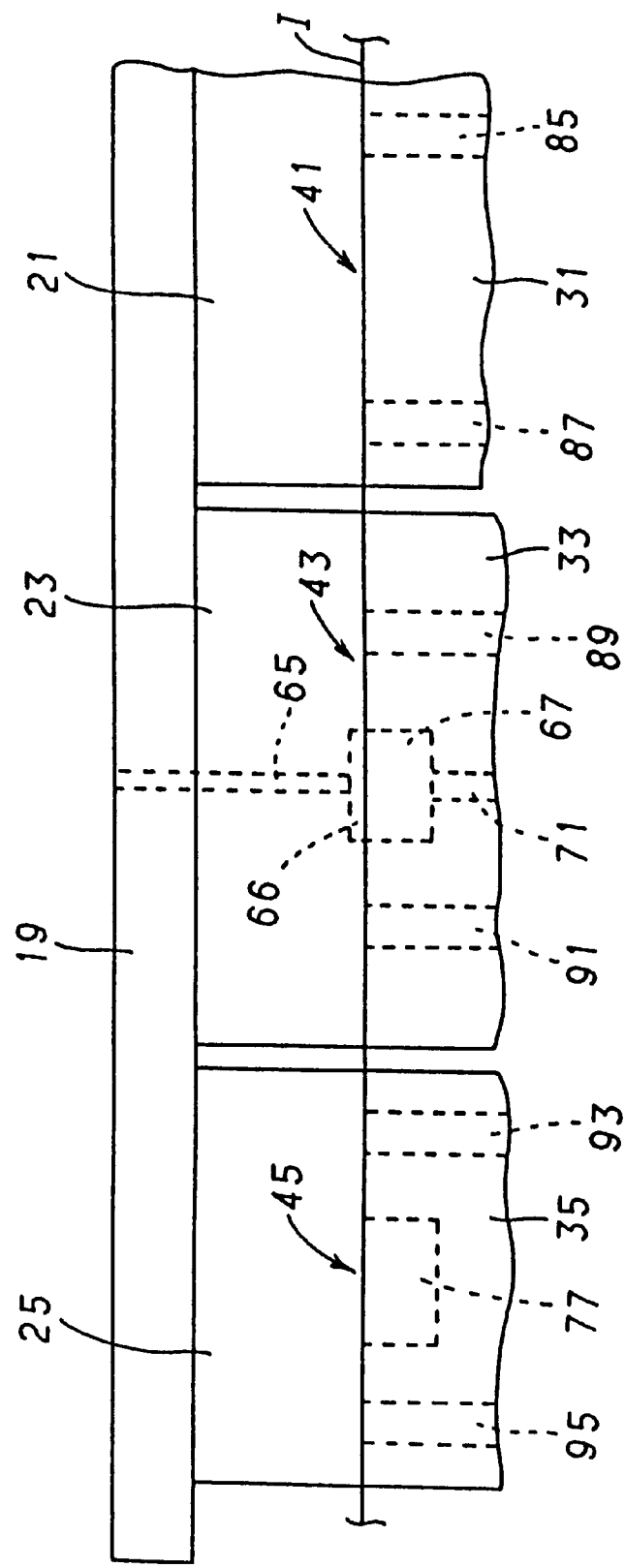
FIG. 12 is a front view of a portion of the apparatus for producing a molded article according to the first embodiment of the invention illustrating an operational movement thereof.
Figure 13:
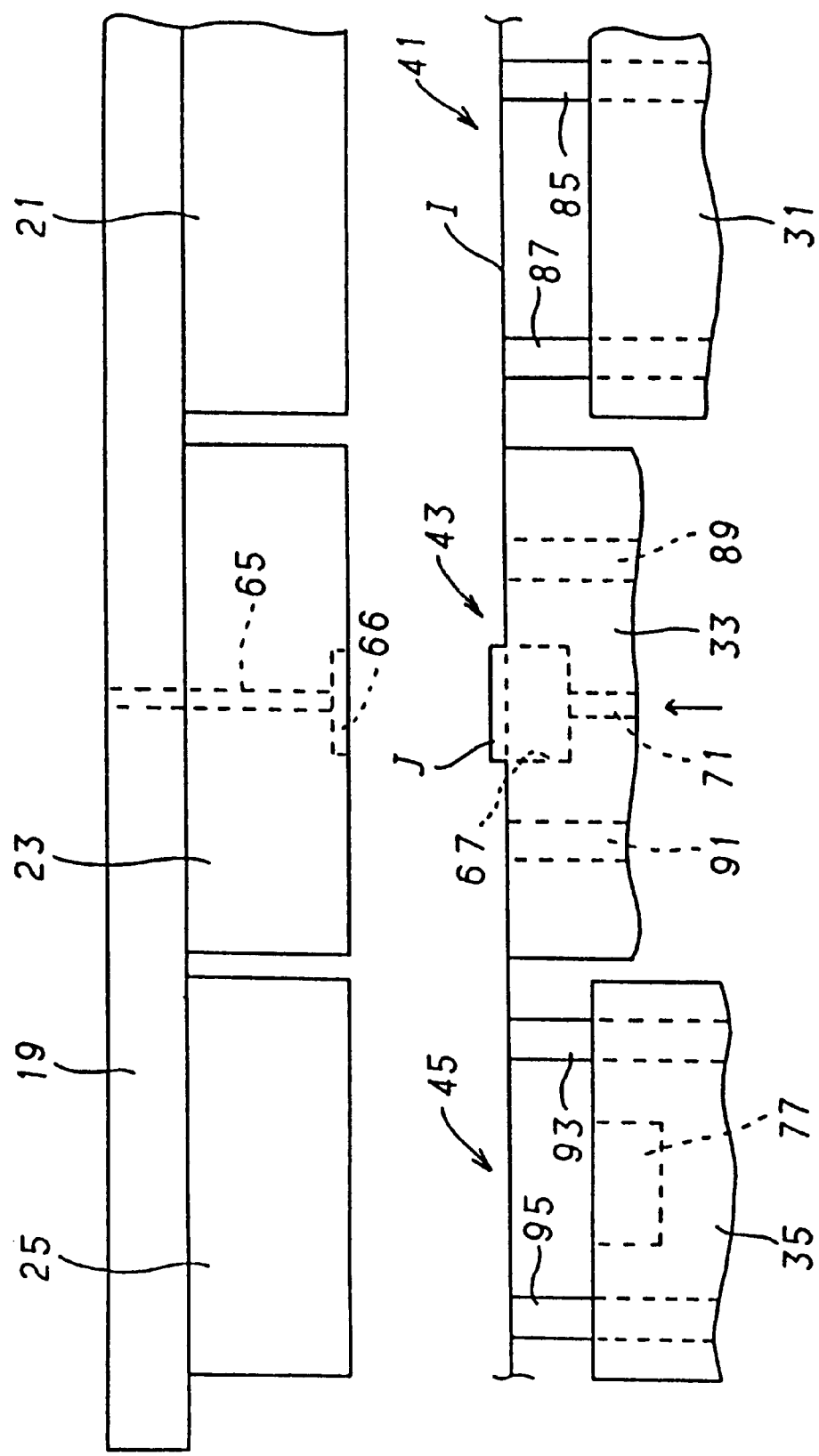
FIG. 13 is a front view of a portion of the apparatus for producing a molded article according to the first embodiment of the invention illustrating an operational movement thereof.
Figure 14:
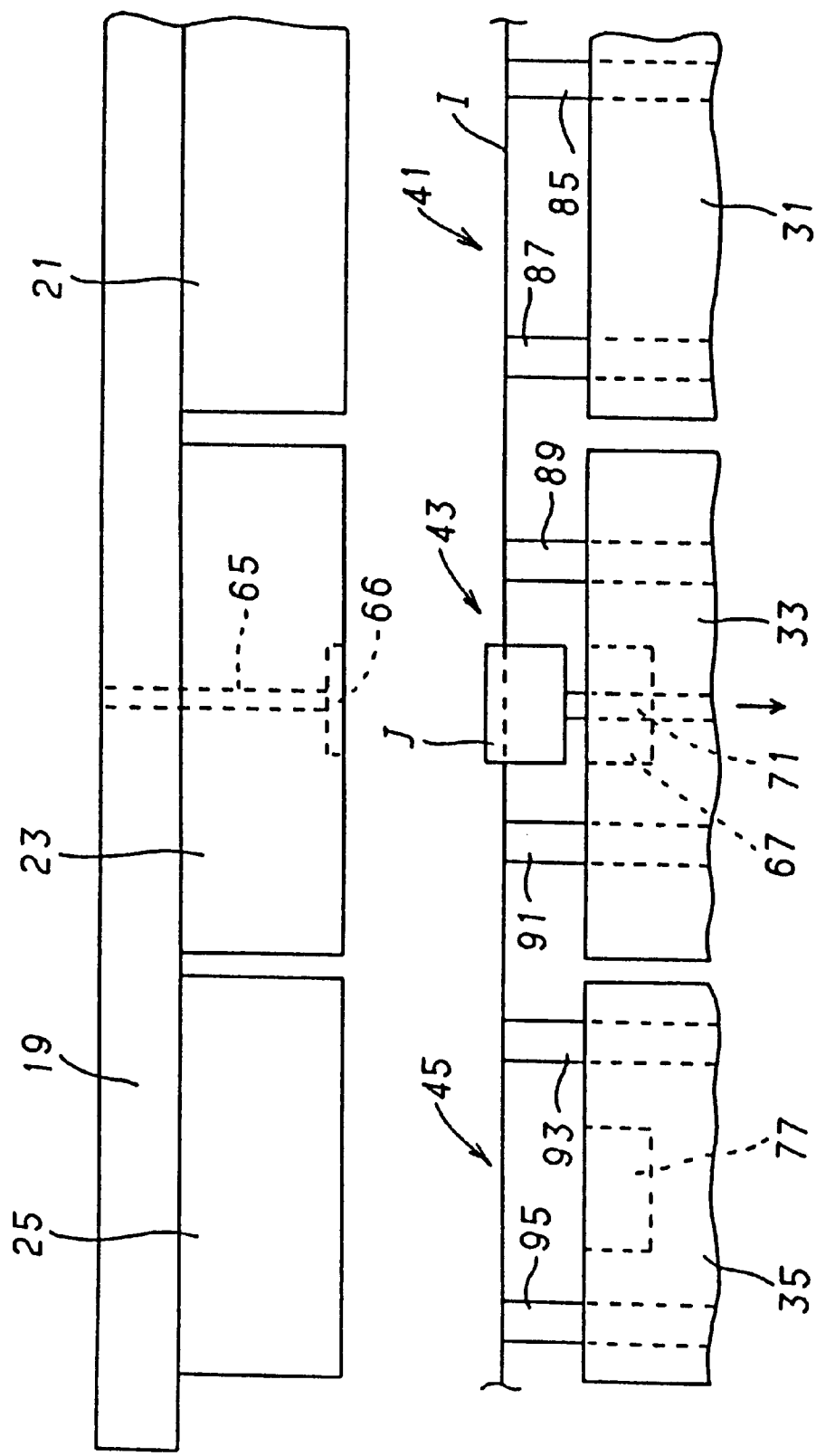
FIG. 14 is a front view of a portion of the apparatus for producing a molded article according to the first embodiment of the invention illustrating an operational movement thereof.

The stationary die 33 is remained in its home position, until when the movable die 23 has been actuated from the position shown in FIG. 11 to the position shown in FIG. 12.

As the movable die 23 is opened, the stationary die 33 is moved a predetermined distance, by means of a drive unit for the stationary die (not shown), toward the movable die 23 and stopped at its home position.

Then, the push-up pin 71 is extended so as to push the resin-molded portion J out of the recess 67, while at the same time, the stationary die 33 is moved away from the movable die 23 by the drive unit for the stationary die. Since the stationary die 33 is moved in the above manner, excessive tension is prevented from being applied to the metal sheet.

Figure 15:
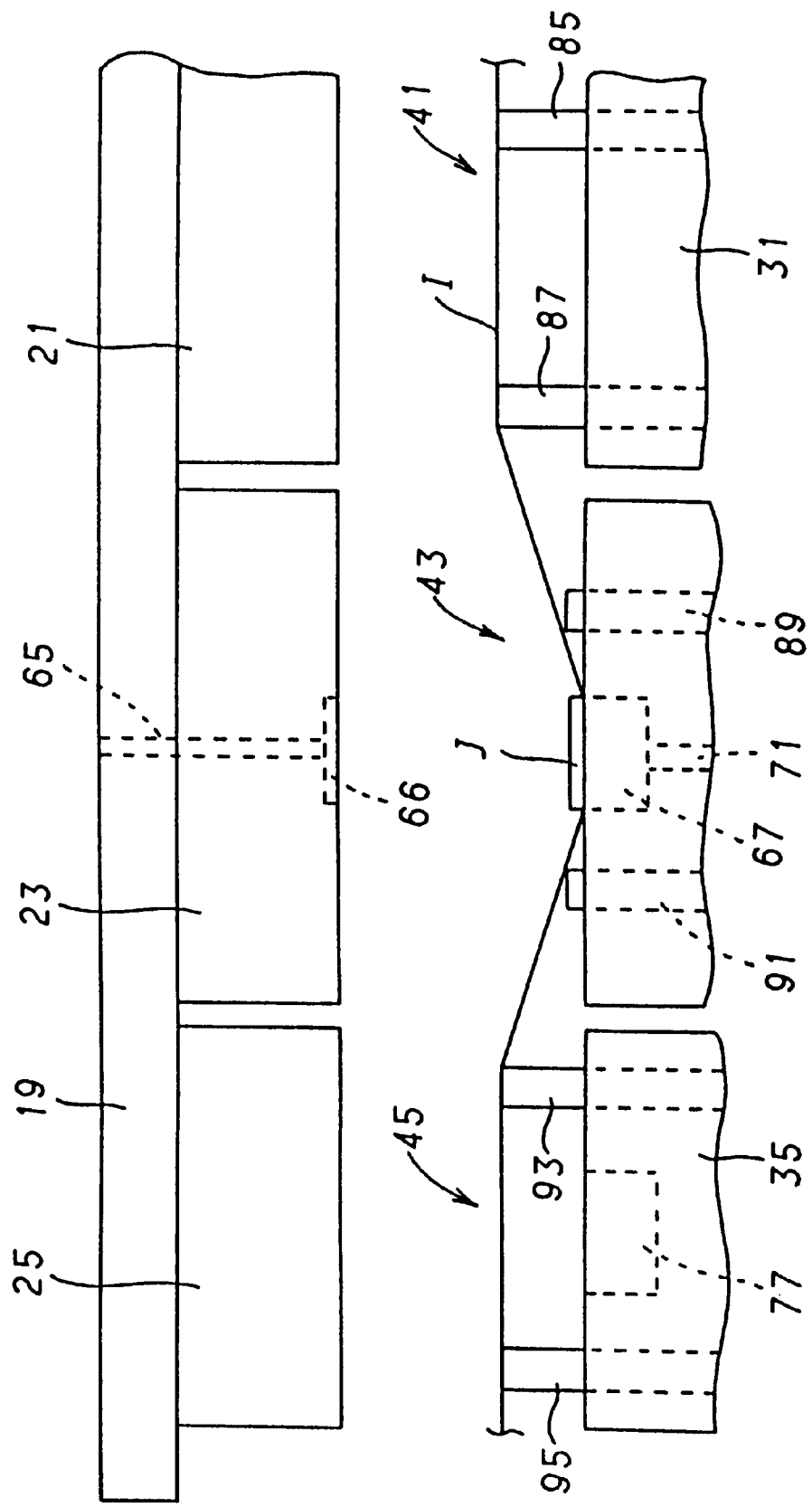
FIG. 15 is a front view of a portion of the apparatus for producing a molded article according to the first embodiment of the invention illustrating an operational movement thereof.

Specifically, the resin-molded portion J becomes snugly fitted within the recess 67 after completion of the insert molding, as shown in FIG. 15. If it is intended to open the movable die 23 while the stationary die 33 is in its home position, extension of the lifter pins 84, 85, 87, 93 and 95 might disadvantageously cause the metal sheet I to be pulled diagonally downwardly at its opposite portions on each side of the resin-molded portion J, thus causing excessive tension which may cause breakage of the metal sheet.

In order to avoid such excessive tension, the stationary die 33 is moved, by means of the drive unit for the stationary die, away from the movable die 23, so as to accommodate tension to be applied to the metal sheet I.

It is also noted that, if the resin-molded portion J is removed from the recess 67 by means of the push-up pin 71, elastic deformation of the resin-molded portion J may be caused. This might cause the metal sheet I to be pulled diagonally upwardly, thus causing excessive tension therein which might cause breakage of the metal sheet.

In order to prevent the metal sheet I to be pulled in the diagonally upward direction, the metal sheet transportation device 83 is moved upwardly by the elevator device 81, so as to accommodate tension which otherwise might be applied to the metal sheet I.

In the shearing section 45, the base portions of the terminals 155 and 157 are severed by the respective cutters 73 and 75, and the molded article S is removed from the metal sheet I and fallen into a chute (not shown) for collection, as shown in FIG. 15.

Figure 16:
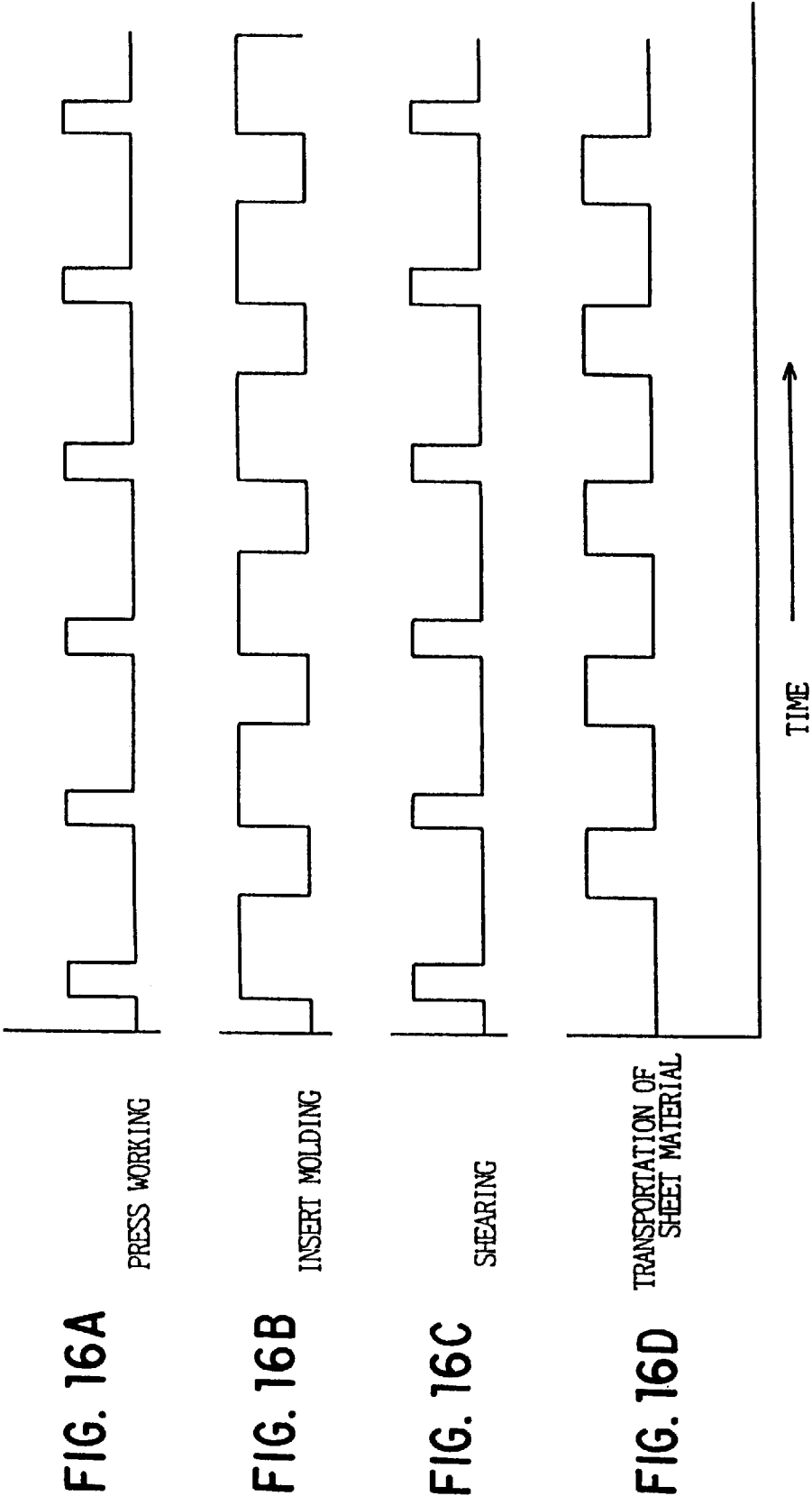
FIG. 16 is a time chart illustrating operation of the apparatus for producing a molded article according to the first embodiment of the invention.

The above-mentioned press working, insert molding and shearing operations are performed in a synchronous manner as shown in the time chart of FIG. 16. In this regard, it should be noted that the movable plate 21, movable die 23 and punch plate 25 are opened after completion of the insert molding, since the insert molding requires the most extended time of period among the stages. The metal sheet I is move forward a distance P by means of the metal sheet transportation device 79 and then stopped in order to perform the above operations. Such operations will be continuously performed as shown in the time chart.

Although the invention has been explained in detail with respect to the first embodiment, the invention should not be limited to the particular construction in the above embodiment. Any variations and modifications of design within the spirit and scope of the invention may be covered by the invention.

In the above embodiment, the press working, insert molding and shearing operations have been performed in this order. It is noted, however, that any number of stages of press working and insert molding, and any combination thereof may be employed, provided that the shearing stage or operation is selected to be a final stage.

The drive unit for the stationary die and the elevator device 81 may be driven, for example, by an electric motor or the like, instead of the above hydraulic means.

A second embodiment according to the invention will be explained below with reference to FIGS. 17 through 35.

Figure 17:
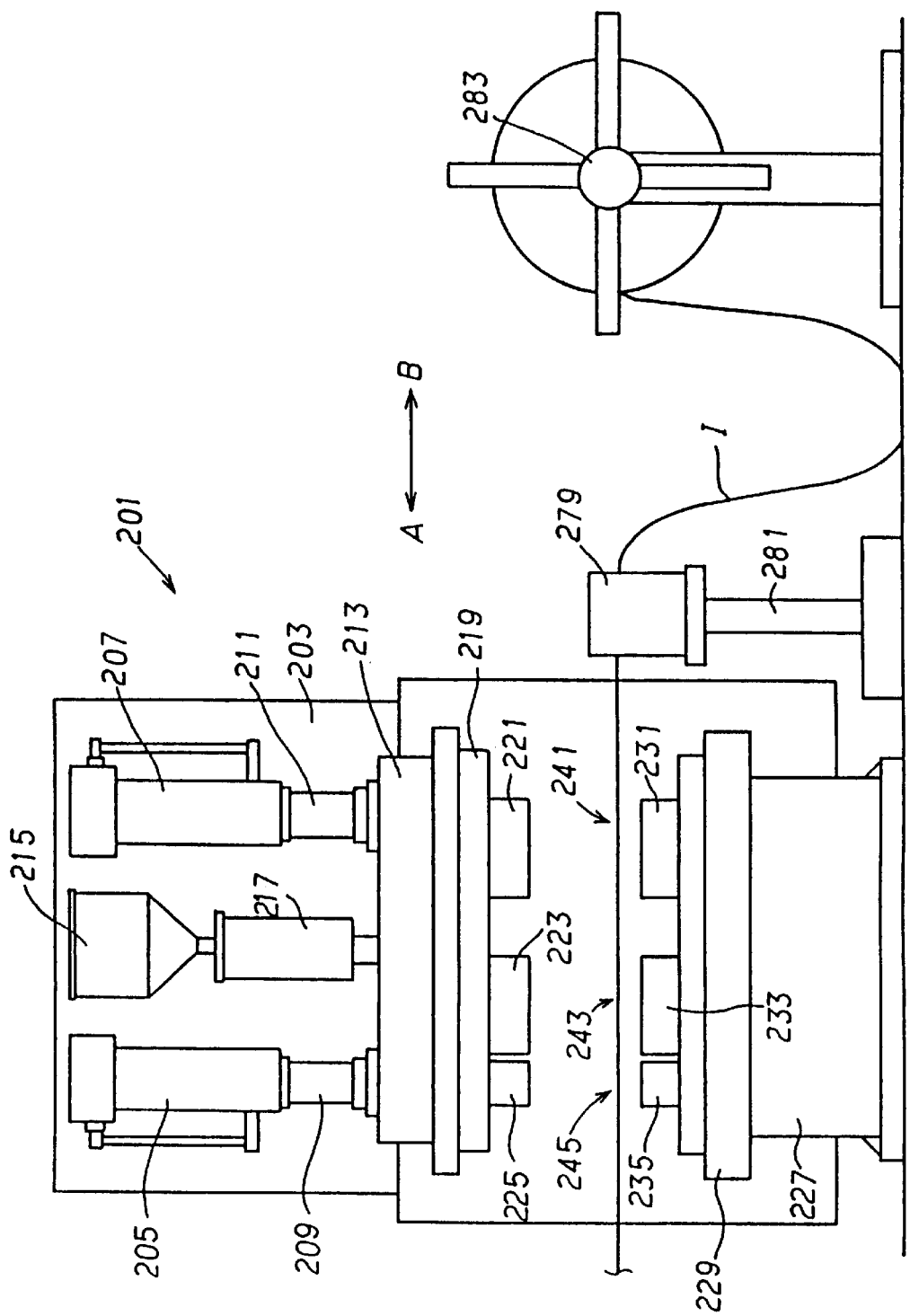
FIG. 17 is a front view illustrating an apparatus for producing a molded article according to a second embodiment of the invention
Figure 18:
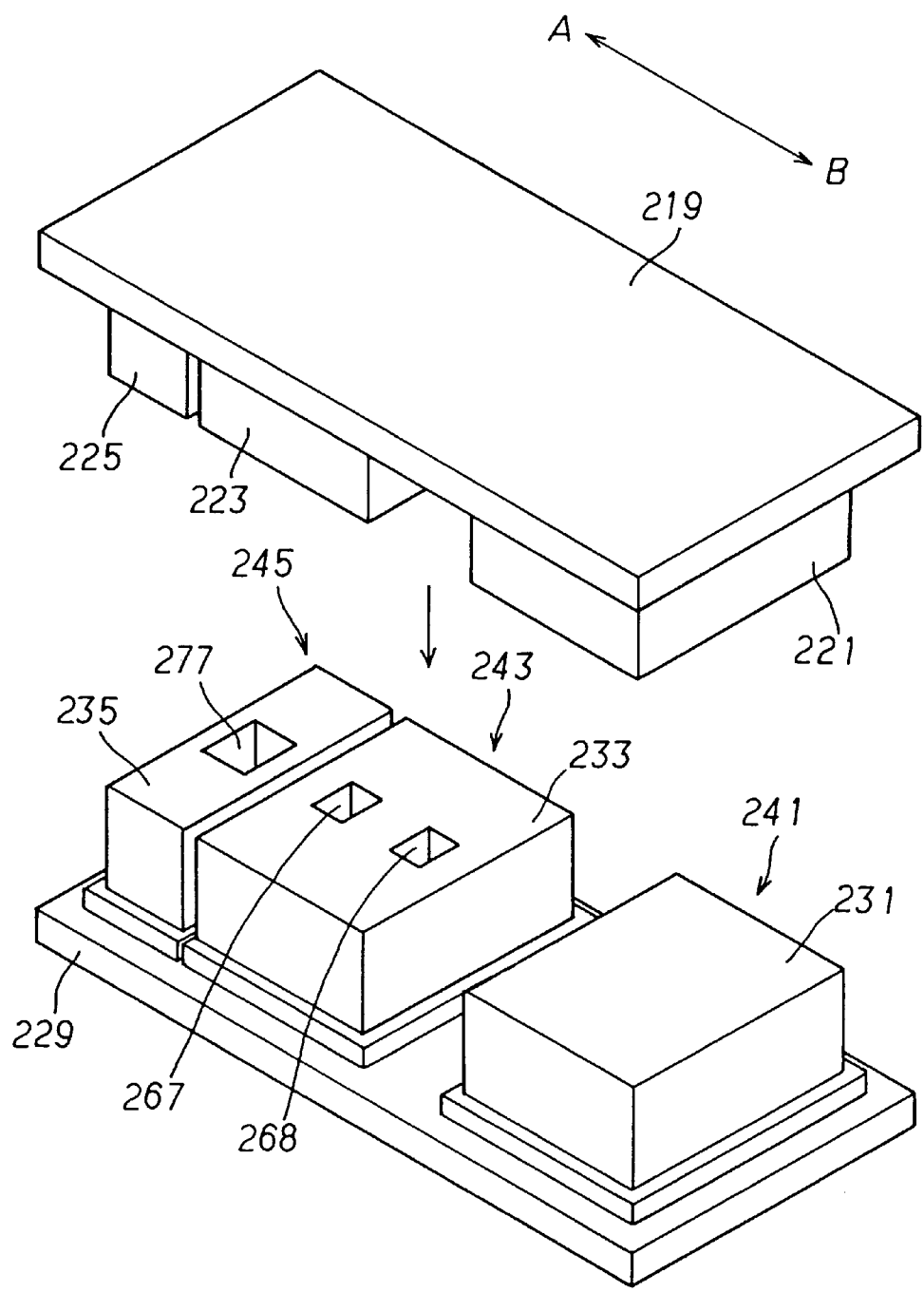
FIG. 18 is a perspective view illustrating a portion of the apparatus for producing a molded article according to the second embodiment of the invention.

An apparatus 201 for producing a molded article according to a second embodiment of the invention is illustrated in FIG. 17.

In this drawing, reference numeral 203 designates a body of the apparatus. A pair of cylinders 205 and 207 are disposed at the upper portion of the apparatus body 203. A ram 209 of the cylinder 205 and a ram 211 of the cylinder 207 are connected to the upper surface of a movable base 13.

A hopper 215, as well as a heating cylinder 217 connected to the hopper 215, is disposed between the cylinder 205 and the cylinder 207. The lower end of the heating cylinder 217 is extended into the movable base 13.

An attachment base 219 is secured to the movable base 13 at its lower surface. A movable plate 221, a movable die 223 and a punch plate 225 are mounted on the attachment base 2019 at its lower surface. The movable die 223 is spaced apart from the movable plate 221.

Reference numeral 227 designates a base plate. A stationary base 229 is attached to the base plate 27 at its upper surface. A movable plate 231, a stationary die 233 and a die plate 235 are mounted on the stationary base 229 at its upper surface.

The stationary plate 231 is disposed oppositely to the movable plate 221. The stationary die 233 is disposed oppositely to the movable die 223. The die plate 235 is disposed oppositely to the punch plate 225. The stationary die 233 is movably mounted so as to be moved in a direction away from and toward the stationary plate 231 (referred to as "A-B direction hereinbelow)

A piston rod of a hydraulic cylinder (not shown) is connected to the stationary die 233. The stationary die 233 may be moved by the hydraulic cylinder in the A-B direction between a position in which the stationary die 233 is opposed to the movable die 223 and a position in which the stationary die 233 is not opposed to the movable die 223. The hydraulic cylinder constitutes means for moving the stationary die 233 in the A-B direction.

A press working section 241 is constituted by the movable plate 221 and the stationary plate 231, while a insert molding section 243 is constituted by the movable die 223 and the stationary die 233. A shearing section 245 is constituted by the punch plate 225 and the die plate 235.

Figure 19:
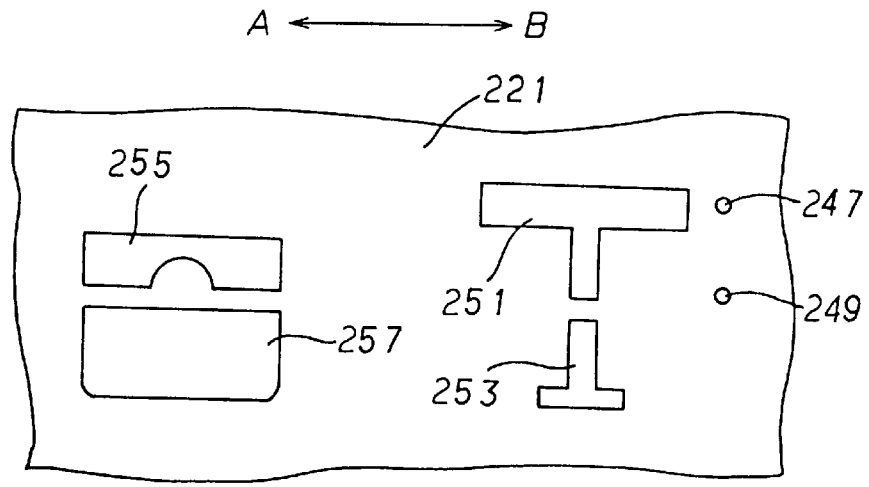
FIG. 19 is a plan view illustrating a portion of a movable die of the apparatus for producing a molded article according to the second embodiment of the invention.
Figure 20:
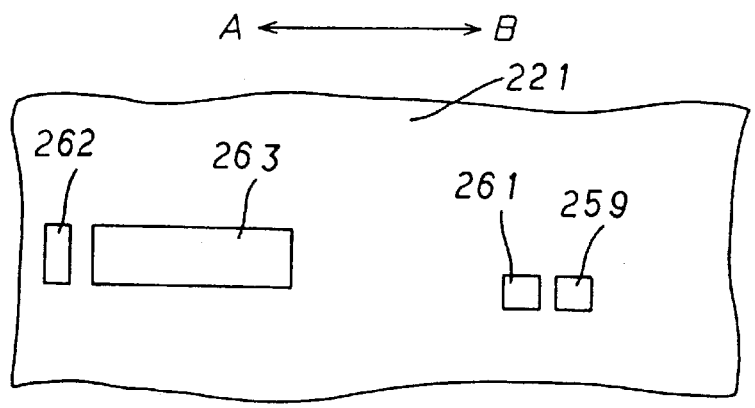
FIG. 20 is a plan view illustrating a portion of the movable die of the apparatus for producing a molded article according to the second embodiment of the invention.

As shown in FIG. 19, blanking punches 247, 249, 251 and 253 are provided on the movable plate 221. Blanking punches 255 and 257 are also provided on the movable plate 221 at a respective position spaced from the above blanking punches by a predetermined distance. Folding punches 259 and 261 are also provided on the movable plate 221, as shown in FIG. 20. Another blanking punches 263 and 262 are also provided on the movable plate 21 at a respective position spaced from the folding punches by a predetermined distance, as shown in FIG. 20.

The stationary plate 231 has also formed therein a plurality of apertures corresponding to the blanking punches 247, 249, 251, 253, 255, 257, 263 and 262 on the movable plate 221. The above apertures are in communication with a chute (not shown).

The stationary plate 231 has also formed threrin a plurality of apertures corresponding to the folding punches 259 and 261 on the movable plate 221.

Recesses 266 and 264 are formed in the movable die 223 in its lower surface, the recesses 266 and 264 being spaced apart from one other. The recess 266 is in communication with a runner 265, while the recess 264 is in communication with a runner 269. The runners 265 and 269 are connected to the lower end of the heating cylinder 217.

The stationary die 233 is formed with recesses 267 and 268, these recesses being spaced apart from one another. Reference numeral 271 designates a push-up pin. The push-up pin 271 may be actuated between a position in which it is protruded from the lower surfaces of the recesses 267 and 268 and a position in which it is flushed, at its forward end, with the bottoms of the recesses 267 and 268.

The stationary die 233 is adapted to be movable in a direction toward and away from the movable die 223, i.e., in the vertical direction, by means of a hydraulic drive unit for the stationary die. The drive unit for the stationary die is adapted to be operable in sequence with the actuation of the rams 209 and 211.

Figure 21:
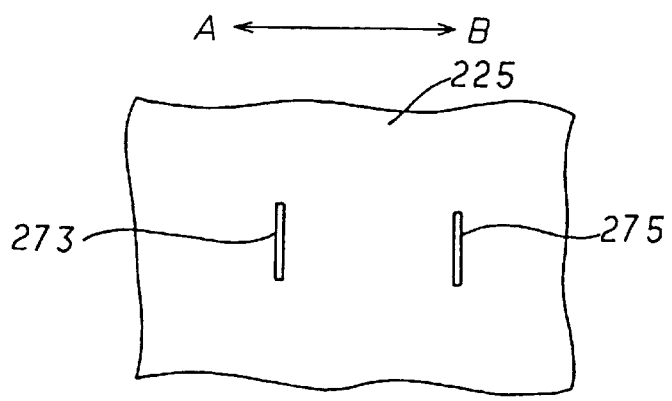
FIG. 21 is a plan view illustrating a portion of a punch plate of the apparatus for producing a molded article according to the second embodiment of the invention.

As shown in FIG. 21, the punch plate 225 is provided with cutters 273 and 275. The die plate 235 is formed to have a recess 277 corresponding to the cutters 273 and 275. The recess 277 is in communication with a chute (not shown).

Lifter pins 284, 287, 289, 291, 293 and 295 are provided at the sides of the stationary plate 231, the stationary die 233 and the die plate 235. Lifter pins 285 and 290 are respectively located at the center of the stationary plate 231 and 233. The lifter pins 284, 285, 287, 289, 290, 291, 293 and 295 are adapted to be operable between a position in which they protrude from the respective upper surfaces of the stationary plate 231, the stationary die 233 and the die plate 235 and a position in which they are entirely received within the respective plates and die.

Figure 24:
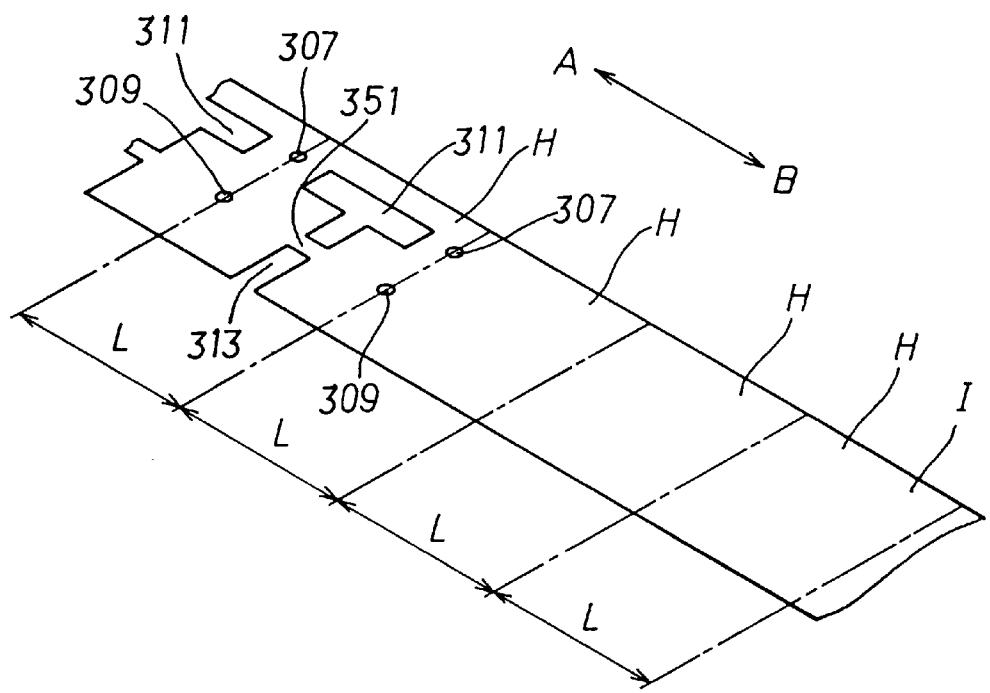
FIG. 24 is a perspective view illustrating a press working operation to be performed by the apparatus for producing a molded article according to the second embodiment of the invention.
Figure 25:
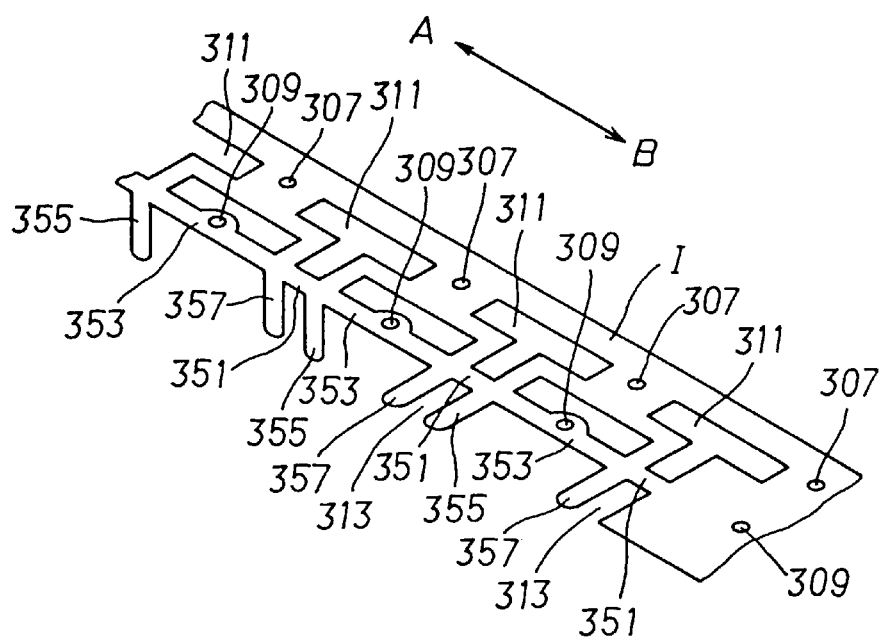
FIG. 25 is a perspective view illustrating a press working operation to be performed by the apparatus for producing a molded article according to the second embodiment of the invention.

As shown in FIG. 24, the metal sheet I is processed at its each unit area outlined by dotted line. The unit area outlined by dotted line will be referred to as a "working portion H" hereinbelow.

The metal sheet I is fed forward by a pitch corresponding to the length of the working portion H and then stopped for working operation.

Reference numeral 279 designates a device for transporting a continuous length of working portions H of the metal sheet I, by one pitch, to an area defined by the opposed stationary plate 231 and the movable plate 221, an area defined by the opposed stationary die 233 and the movable die 223, and an area defined by the opposed die plate 235 and the punch plate 225.

The metal sheet transportation device 279 is supported by an elevator device 281. The elevator device 281 is adapted to be operated in sequence with the operation of the rams 209 and 211.

Reference numeral 283 designates a support device for metal sheet. The metal sheet support device 283 has the continuous length of metal sheet I, wound in a rolled configuration, around its rotatable shaft. When the rotatable shaft is rotated, the continuous length of metal sheet I is fed to the metal sheet transportation device 279.

Operation of the apparatus 201 for producing an molded article will be explained below.

A first transportation process for the metal sheet is as follows.

When the rotatable shaft of the metal sheet support device 283 is driven, the metal sheet I in a rolled configuration is supplied or fed forwardly. The working portions H of the metal sheet I is further supplied by one pitch, due to the actuation of the metal sheet transportation device 279, to the area between the stationary plate 231 and the movable plate 221, the area between the stationary die 233 and the movable die 223, and the area between the die plate 235 and the punch plate 225. Then, the metal sheet is stopped and supported by the lifter pins 284, 285, 287, 289, 290, 291, 293 and 295.

Figure 22:
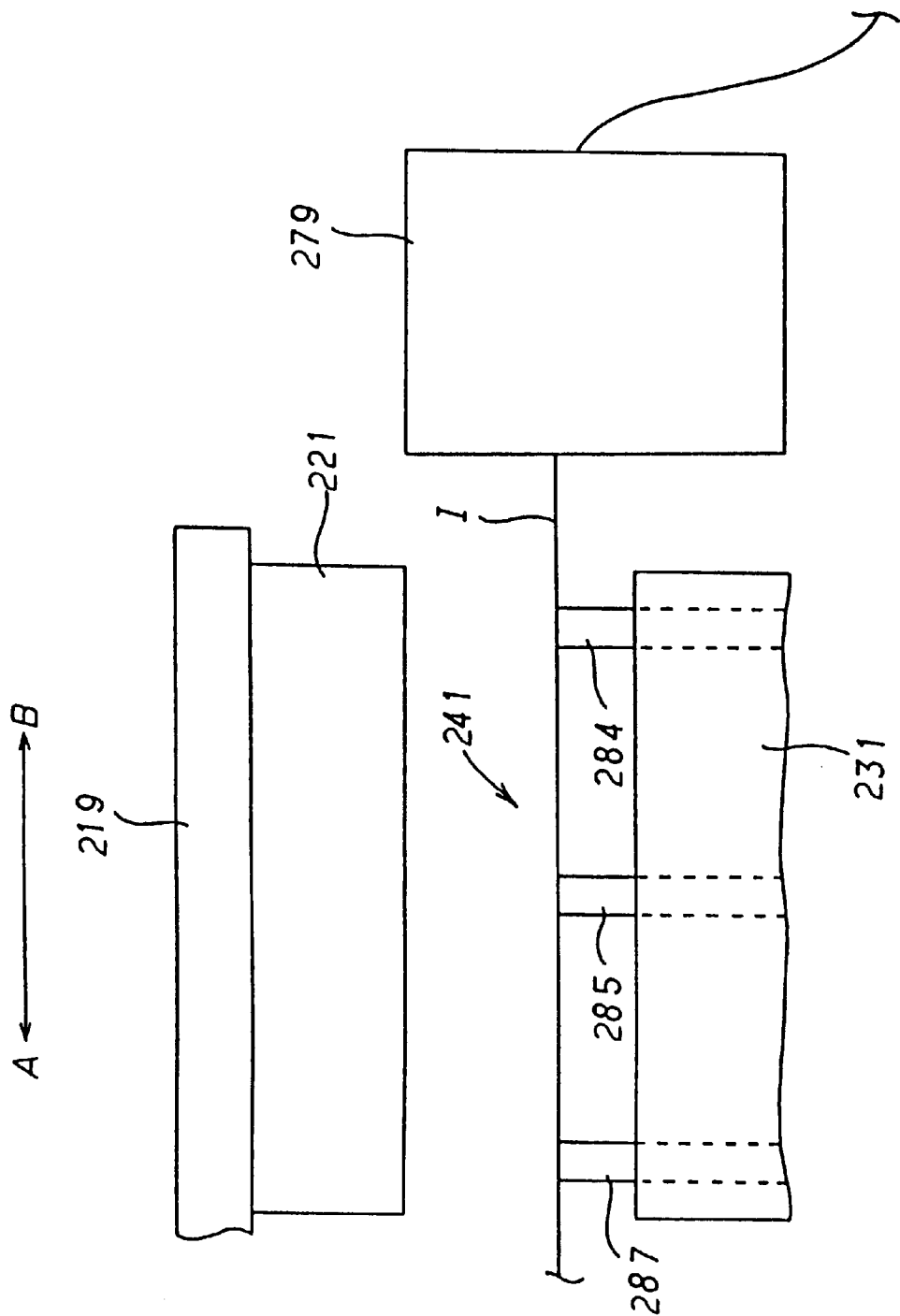
FIG. 22 is a front view illustrating a vertical operational movement of a metal sheet transportation device mounted on the apparatus for producing a molded article according to the second embodiment of the invention.

When the movable plate 221, the movable die 223 and the punch plate 225 are in their open positions as shown in FIG. 22, the sheet metal transportation device 279 is held at its home position of a predetermined height, so that a gap of a predetermined distance is formed as between the metal sheet and the upper surface of the movable plate 231.

Synchronous operation process will be explained below.

The rams 209 and 211 are actuated, so as to cause the movable plate 221, the movable die 223 and the punch plate 225, together with the movable base 213 and the attachment base 219, to be lowered to their closed positions relative to the stationary plate 231, the stationary die 232 and the die plate 235. As the movable plate 221, the movable die 223 and the punch plate 225 are closed, the lifter pins 284, 285, 287, 289, 291, 293 and 295 are lowered into the stationary plate 231, the stationary die 223 and the die plate 235 from their upper surface.

Figure 23:
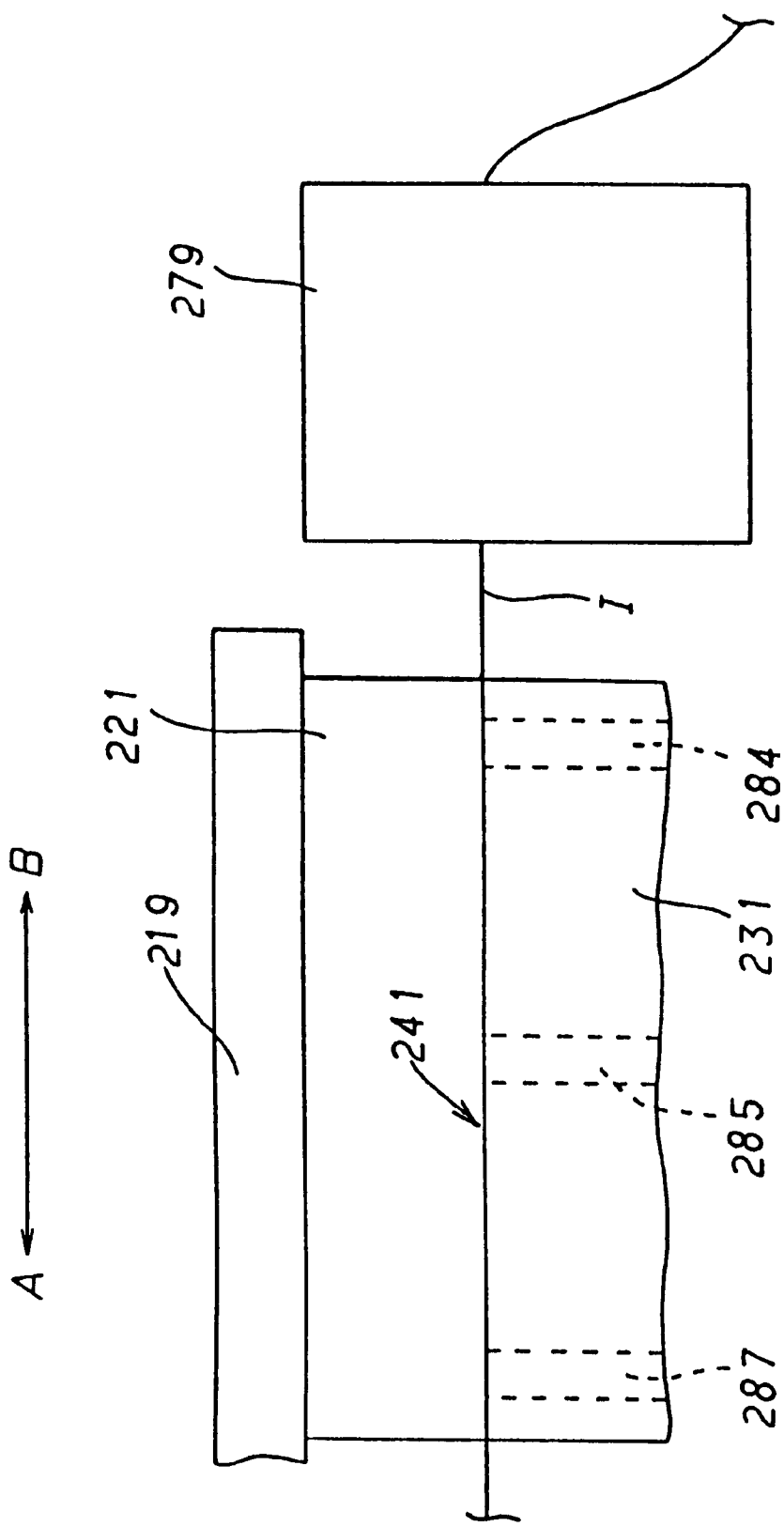
FIG. 23 is a front view illustrating a vertical operational movement of a metal sheet transportation device mounted on the apparatus for producing a molded article according to the second embodiment of the invention.

As shown in FIG. 23, the elevator device 281 is actuated in synchronous with the closing operation of the movable plate 221, the movable die 223 and the punch plate 225. By this, the metal sheet transportation device 279 is lowered, so that the metal sheet I, maintaining its horizontal position, will be lowered.

In the press working section 241, a press working operation is performed to the working portion H of the metal sheet I. In the insert molding section 243, an insert molding operation is performed to the working portion H of the metal sheet I to which the press working operation has been already performed. In the shearing section 245, a shearing operation is performed to the working portion H of the metal sheet I to which the insert molding operation has been already performed. The press working operation, the insert molding operation and the shearing operation are performed in a synchronized manner.

Operation of the press working, insert molding and shearing will be explained below.

In the press working section 241, small apertures 307 and 309 of a circular configuration, a T-shaped opening 311 and a notch 313 are formed in the working portion H of the metal sheet I by means of blanking punches 247, 249, 251 and 253, whereby a connection portion 351 of a small dimension is formed. This process will be referred to as a "first press working operation" hereinbelow. Blanked-out pieces from the sheet metal fall into a chute (not shown).

Each small, circular apertures 307, 309 is detected by a sensor (not shown) and serves as a positional reference for performing the press working, insert molding and shearing operations relative to the working portion H of the metal sheet I.

A connection portion 353 of a large dimension and terminals 355 and 357 are formed in the working portion H of the metal sheet I, to which the first press working process has been performed, by means of the blanking punches 255 and 257. This process will be referred to as a "second press working operation" hereinbelow.

Blanked-out pieces from the sheet metal fall into a chute (not shown).

After completion of the first and second press working processes, the terminal 355 of the working portion H of the metal sheet I is folded, by means of the folding punch 259, downwardly at a right angle. This process will be referred to as a "third press working operation" hereinbelow.

After completion of the first, second and third press working operations, the terminal 357 of the working portion H of the metal sheet I is folded, by means of the folding punch 261, downwardly at a right angle. This process will be referred to as a "fourth press working process" hereinbelow.

After completion of the first, second, third and fourth press working processes, the working portion H of the metal sheet I is blanked by means of the blanking punches 263 and 262 to as to form the connection portion 350 of a small dimension and the connection portion 353 of a large dimension. This process will be referred to as a "fifth press working process" hereinbelow. Blanked-out pieces from the metal sheet fall into a chute (not shown).

When the first, second, third, fourth and fifth press working processes have been completed, the metal sheet is transferred from the press working process to the insert molding process.

In the insert molding section 243, terminals 355 and 357 are accommodated respectively within two cavities respectively defined by the recesses 266 and 267, and the recesses 264 and 268. Then, a quantity of resin is charged into each of the cavities through the respective runners 265, 269 from the heating cylinder 217, so that two moldings J1 and J2 are formed.

Figure 26:
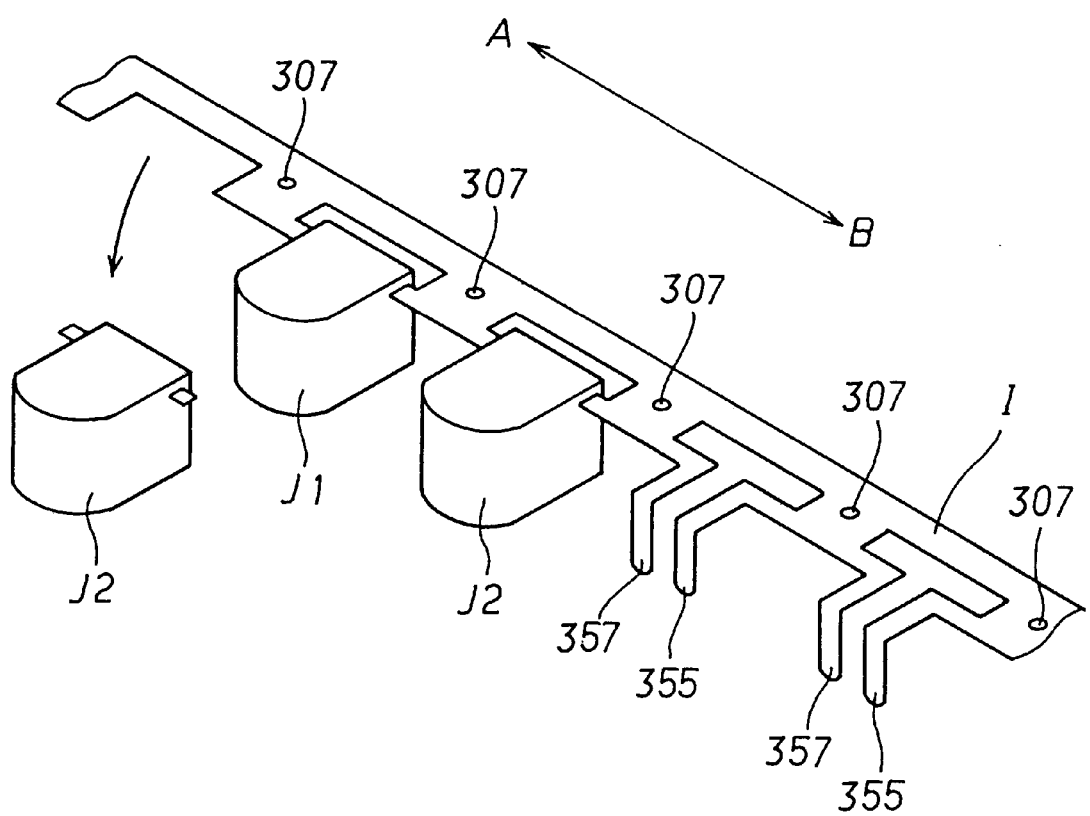
FIG. 26 is a perspective view illustrating press working, insert molding and shearing operations to be performed by the apparatus for producing a molded article according to the second embodiment of the invention.
Figure 27:
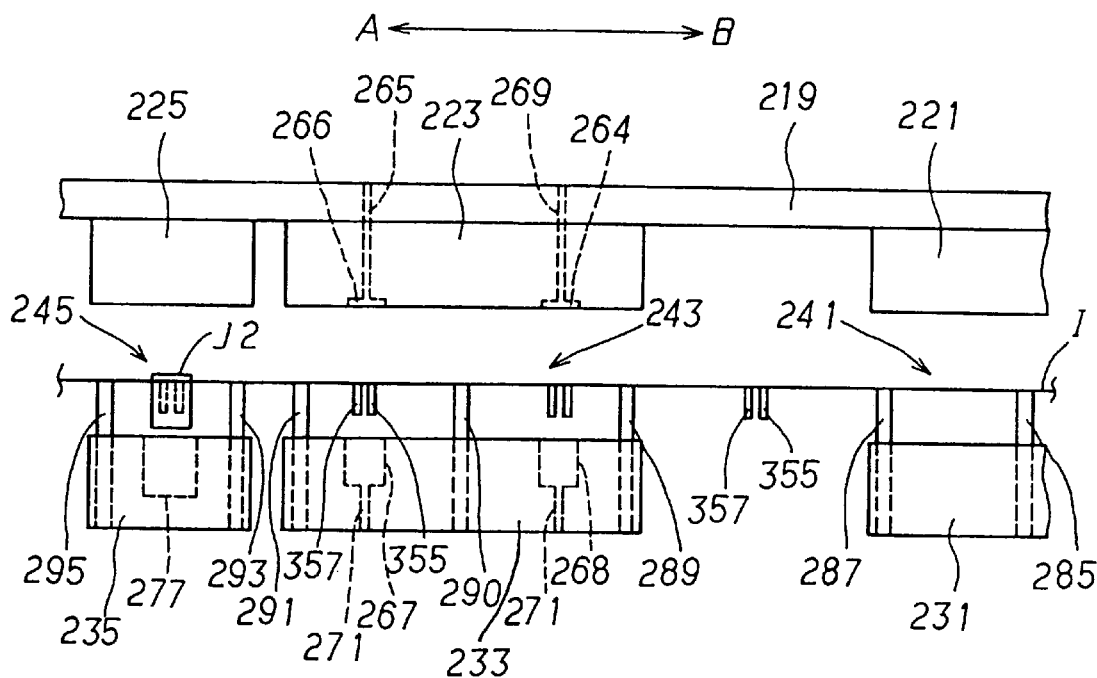
FIG. 27 is a front view of a portion of the apparatus for producing a molded article according to the second embodiment of the invention illustrating an operational movement thereof.
Figure 28:
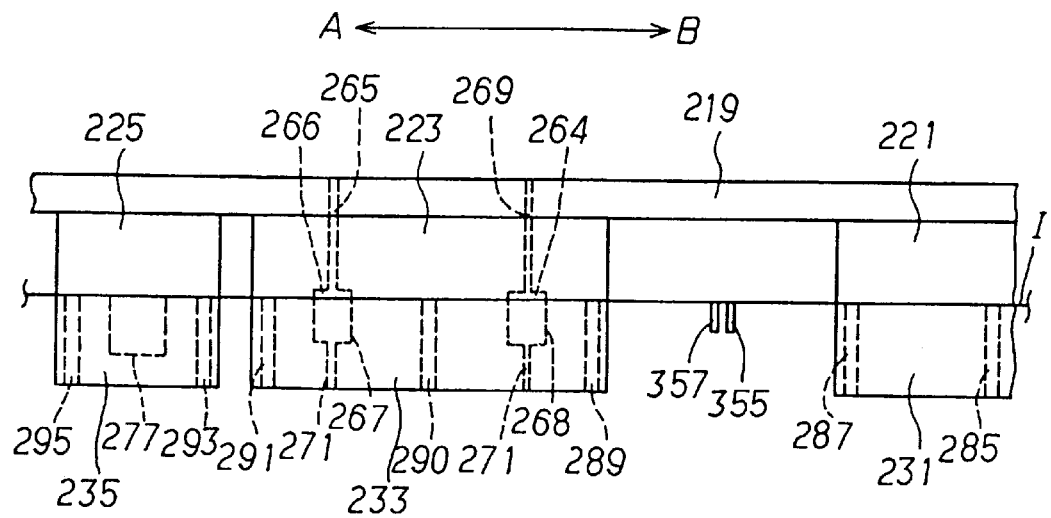
FIG. 28 is a front view of a portion of the apparatus for producing a molded article according to the second embodiment of the invention illustrating an operational movement thereof.

In the shearing section 245, the base portion of each of the terminals 355, 357 is severed by the respective cutters 273, 275, as shown in FIG. 26, whereby the molding J2 already formed therein is severed from the metal sheet I and fallen into a chute (not shown) for collection.

The above press working, insert molding and shearing operations are performed in synchronous manner as shown in the time chart of FIG. 35. The press working operation and the shearing operation both require a processing time of 3 seconds, while the insert molding operation requires a processing time of 25 seconds. Thus, the metal sheet is transferred to the next stage after completion of the insert molding process which is the most time-consuming process.

When the resin has been solidifed and thus the insert molding operation has completed, the rams 209 and 211 are actuated, so as to cause the movable plate 221, the movable die 223 and the punch plate 225, together with the movable base 213 and the attachment base 219, to be raised, whereby the movable plate 221, the movable die 223 and the punch plate 225 are opened.

Figure 29:
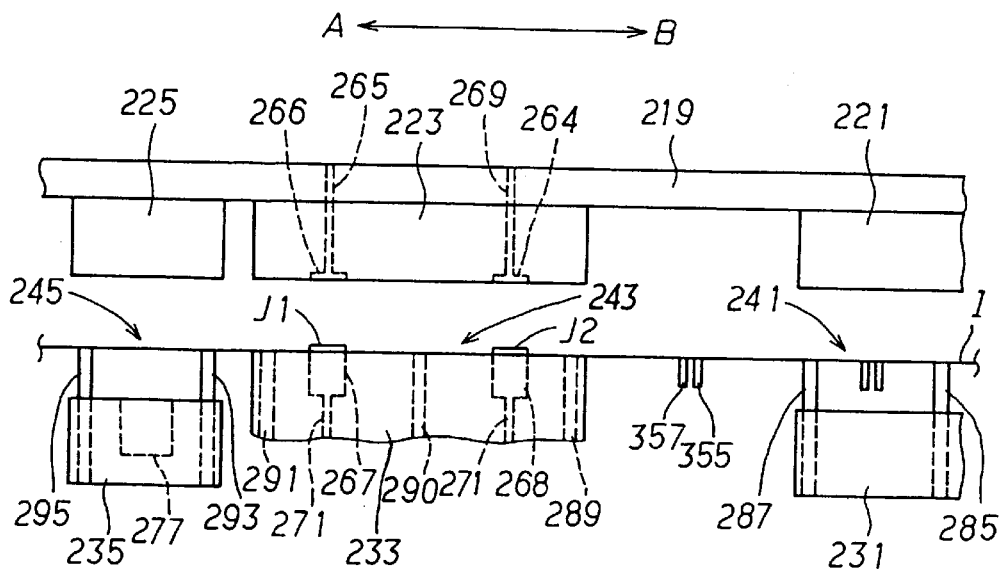
FIG. 29 is a front view of a portion of the apparatus for producing a molded article according to the second embodiment of the invention illustrating an operational movement thereof.
Figure 30:
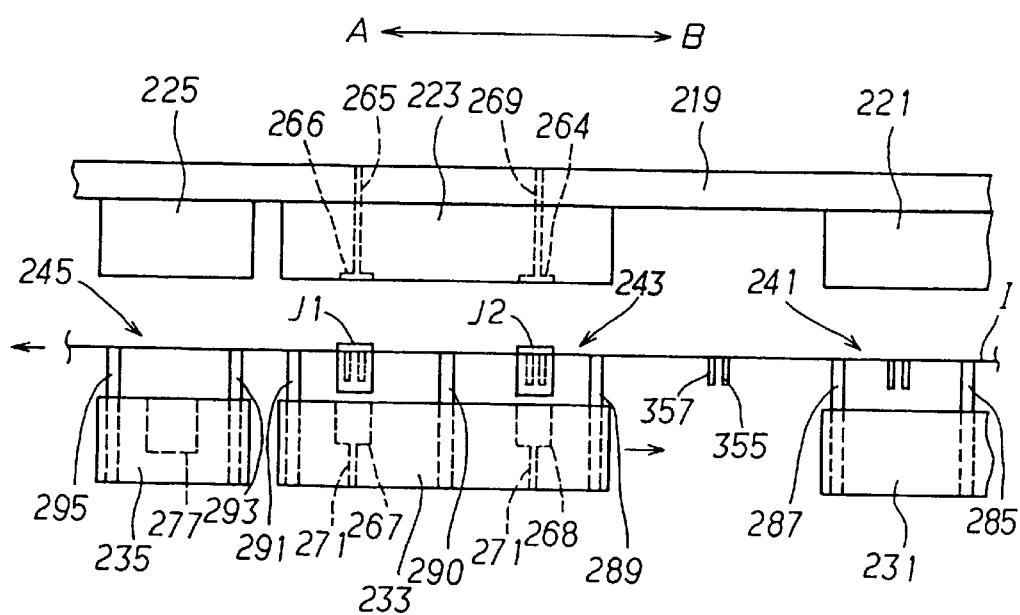
FIG. 30 is a front view of a portion of the apparatus for producing a molded article according to the second embodiment of the invention illustrating an operational movement thereof.

As the movable plate 221, the movable die 223 and the punch plate 225 are opened as shown in FIG. 29, the lifter pins 284, 285, 287, 293 and 295 are protruded from the upper surfaces of the stationary plate 231 and the die plate 235 so as to support the metal sheet I thereon. By this, the elevator device 281 is actuated so as to cause the metal sheet transportation device 279 to be raised. Thus, the metal sheet I maintaining its horizontal position is raised. Then, the metal sheet transportation device 279 is returned to its home position at a predetermined level and stopped there. At this time, the stationary die 233, together with the metal sheet), is raised by a drive unit for the stationary die (not shown) and stopped.

Then, the push-up pin 271 is extended so as to remove the two moldings J1 and J2 from the respective recesses 267, 268, while, at the same time, the stationary die 233 is lowered by means of the drive unit for the stationary die. By this, the lifter pins 289, 290 and 291 are protruded from the upper surface of the stationary die 233 so as to support the metal sheet thereon. By moving the stationary die 233 in the above manner, it possible for the metal sheet I to be subjected to excessive tension.

When the two moldings J1 and J2 are removed from the respective recesses 267 and 268 by means of the push-up pins 271, the metal sheet transportation device 279 is raised by the elevator device 281, so as to accommodate tension which would otherwise be exerted on the metal sheet I. By this, the metal sheet I is prevented from being pulled in a diagonally upward direction.

A second metal sheet transportation process will be explained below.

Figure 31:
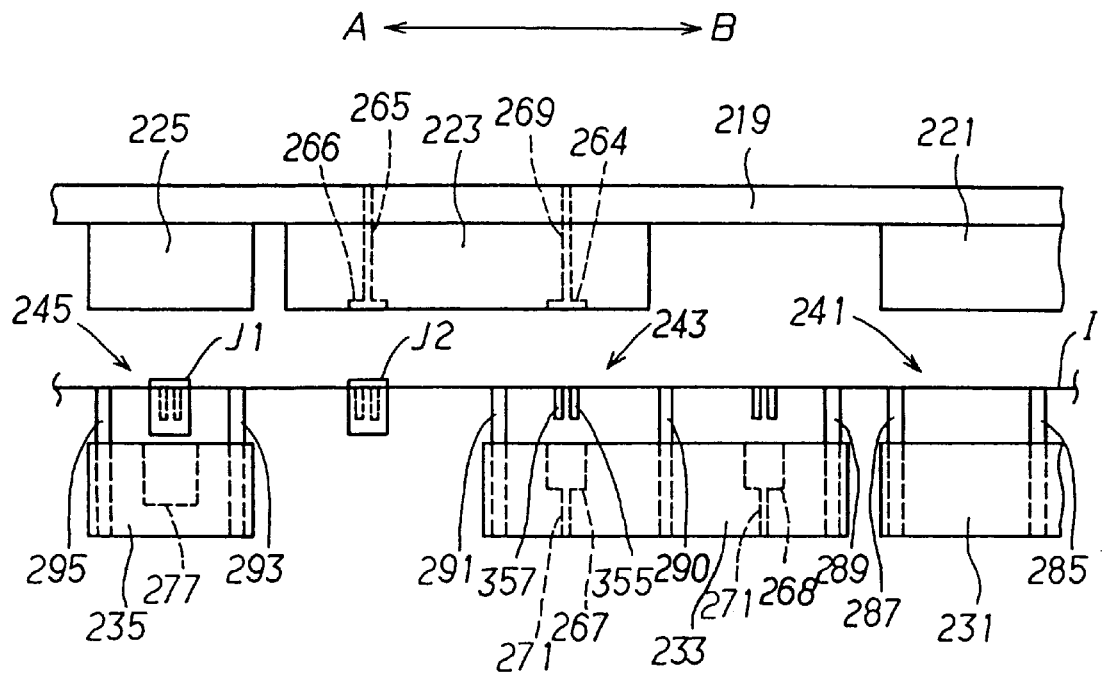
FIG. 31 is a front view of a portion of the apparatus for producing a molded article according to the second embodiment of the invention illustrating an operational movement thereof.

When the moldings J1 and J2 are removed from the respective recesses 267 and 268, the metal sheet transportation device 279 is actuated, as shown in FIG. 31, so as to move forward or feed the metal sheet I by one pitch in the A direction. The molding J1 formed in the metal sheet I is moved to an area defined by the opposed die plate 235 and the punch plate 225, while the molding J2 is moved to a position in which it is opposed to the recess 266 of the movable die 223.

When the metal sheet I is fed forward, the lifter pins 284, 285, 287, 289, 290, 291, 293 and 295 are lowered through the upper surfaces of the stationary die 233 and the die plate 235. When the metal sheet I is stopped, the lifter pins 284, 285, 287, 289, 290, 291, 293 and 295 are extended from the upper surfaces of the stationary plate 231, the stationary die 233 and the die plate 235 so as to support the metal sheet I thereon.

A insert molding section withdrawal process will be explained below.

The piston rod of the hydraulic cylinder connected to the stationary die 233 is extended, so as to cause the stationary die 233 to be moved in B direction. By this, the stationary die 233 is displaced from the position in which it is opposed to the movable plate 223. The stationary die 233 is moved to a position in which the recesses 267 and 268 are both opposed to the working portion H of the metal sheet I to which the press working operation has been performed. Then, the stationary die 233 is moved to a position in which it is not in contact with the molding J2, when the movable die 223 has been closed.

Press working-shearing synchronization process will be explained.

Figure 32:
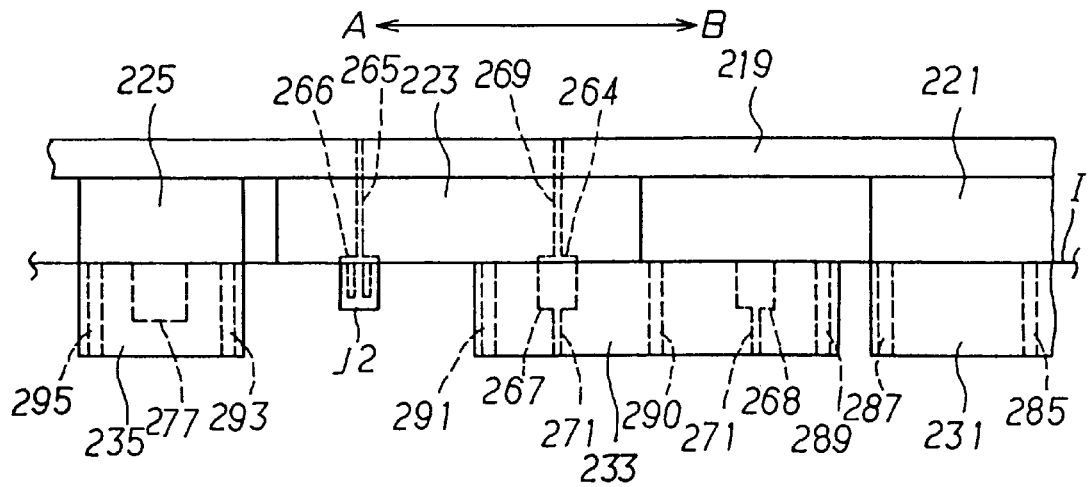
FIG. 32 is a front view of a portion of the apparatus for producing a molded article according to the second embodiment of the invention illustrating an operational movement thereof.

After movement of the stationary die 233, the rams 209 and 211 are actuated, so as to cause the movable plate 221, the movable die 223 and the punch plate 225, together with the movable base 213, to be lowered. By this, the movable plate 221, the movable die 223 and the punch plate 225 are closed relative to the respective stationary plate 231, the stationary die 233 and the die plate 235, as shown in FIG. 32.

When the movable plate 221 has been closed, press working operation relative to the working portion H of the metal sheet I is perfumed in the press working section 241.

When the movable die 223 has been closed, the terminals 355 and 357 are received within the respective recesses 267 and 268 of the stationary die 233 in the insert working section 243. During this period, inset molding is not performed, so that no resin is injected.

In the shearing section 245, the punch plate 225 is closed so as to sever base portions of the terminals 355 and 357, whereby the molding J1 is cut off from the metal sheet I.

The press working and shearing operations are performed in a synchronous manner as shown in the time chart.

Figure 33:
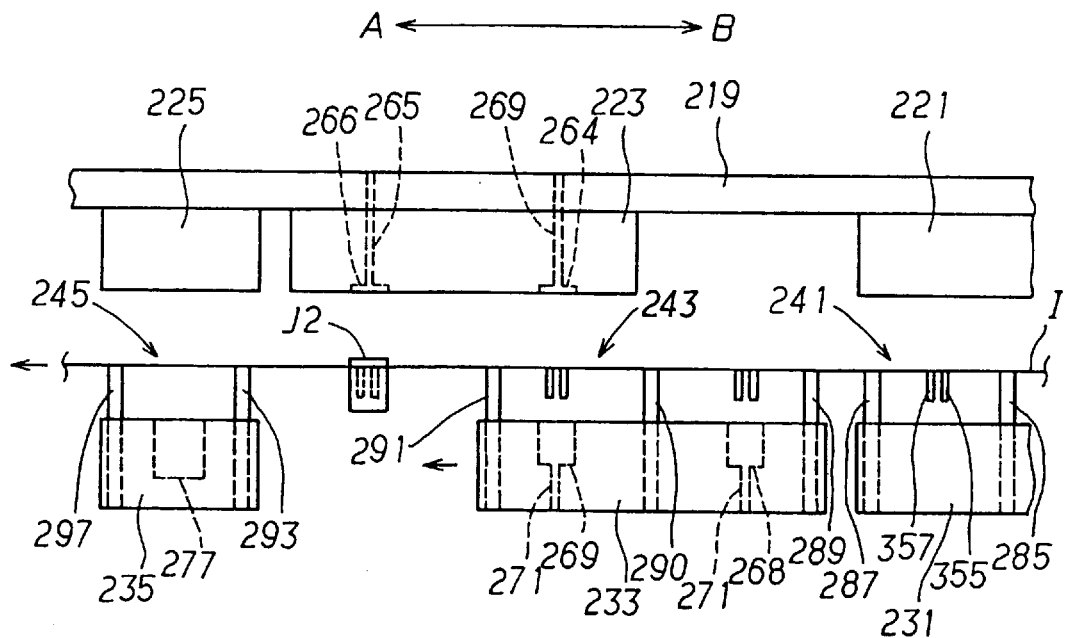
FIG. 33 is a front view of a portion of the apparatus for producing a molded article according to the second embodiment of the invention illustrating an operational movement thereof.

The rams 209 and 211 are actuated, so as to cause the movable plate 221, the movable die 223 and the punch plate 225, together with the movable base 213, to be raised. By this, the movable plate 221, the movable die 223 and the punch plate 225 are opened, as shown in FIG. 33, and then the metal sheet transportation device 279 is returned to it home position at a predetermined level or height.

A third transportation process will be explained.

Figure 34:
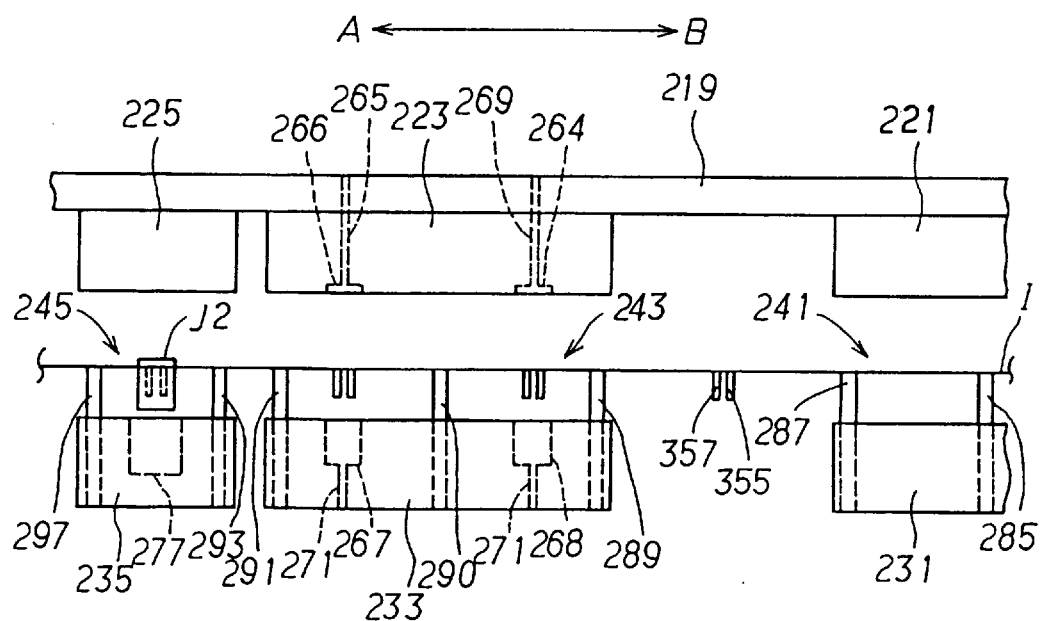
FIG. 34 is a front view of a portion of the apparatus for producing a molded article according to the second embodiment of the invention illustrating an operational movement thereof.

When the metal sheet transportation device 279 has been returned to its home position, the metal sheet transportation device 279 is actuated, as shown in FIG. 34. By this, the metal sheet is fed by one pitch in the A direction. Thus, the molding J2 formed in the metal sheet I is moved to an area defined between the opposed die plate 235 and the punch plate 225, while the working portion H which has not yet been formed with moldings J1 and J2 is moved to the area defining the opposed stationary die 233 and the movable die 221.

A process in which the insert molding section is withdrawn will be explained below.

The piston rod of the hydraulic cylinder connected to the stationary die 233 is extended, so as to cause the stationary die 233 to be moved in the B direction, whereby it is opposed to the movable die 221.

Then, the rams 209 and 211 is actuated, so as to cause the movable plate 221, the movable die 223 and the punch plate 225 to be closed relative to the respective stationary plate 231, with the stationary die 233 and the die plate 235 being opposite to each other.

When the punch plate 225 has been closed, a press working operation is performed relative to the working portion H of the metal sheet I in the press working section 241.

When the movable die 223 has be closed, an insert molding operation is performed, in the insert molding section 243, relative to the working portion H of the metal sheet I to which the press working operation has been performed.

When the movable plate 221 has been closed, the molding J2 is cut off from the metal sheet I in the shearing section 245.

In the apparatus 201 for producing a molded article, the above operations are performed continuously as shown in the time chart.

In the above-mentioned second embodiment, two moldings J1 and J2 are simultaneously produced by a single insert molding operation. In the next process, the insert molding operation requiring about 25 seconds is not performed, and the press working operation and the shearing operation each requiring about 3 seconds are solely performed. Thus, it is possible to produce two moldings in about 28 seconds. This means that the molding may be produced in a short period of time.

In the apparatus 201 for producing a molded article, only the insert molding section 243 is configured to perform processing operation relative to the two working portion H. A single press working section 241 and a single shearing section 245 are provided, each performing processing operation relative to a single number of the working portion H. This construction contributes to prevent increase in size of the apparatus 201 for producing a molded article.

The metal sheet transportation device 279 is so configured that the stationary die 233 is movable to a position in which it is not in contact with the molding J2. Thus, the molding J2 would not be forced into the recess 267 of the stationary die 233, when the movable die 223 is closed, whereby the molding J2 is prevented from being damaged.

Although the invention has been explained with reference to the second embodiment, it should be appreciated that a particular construction of the invention is not limited to the second embodiment, but variations and modifications in design within the spirit of the invention are to be covered by the appended Claims.

The stationary die 233 is configured to be movable to a position in which it is not in contact with the molding, when the movable die 223 has been closed, in accordance with the second embodiment of the invention. It should be understood, however, that the invention is not limited to such a particular construction. For example, the movable die 223, or, both the stationary die 233 and the movable die 223, may be configured to be movable.

Movement of the stationary die 233 to a position in which it is not opposed to the movable die 223 may be performed at an appropriate time after the stationary die 233 has been lowered by the drive unit for the stationary die to be positioned on the upper surface of the stationary base 229 and before the press working and shearing operations are initiated in the press working/shearing synchronous operation.

Movement of the stationary die 233 to a position in which it is opposed to the movable die 223 may be performed at an appropriate time after the metal sheet transportation 279 has been returned to its home position and before press working, insert molding and shearing operations are initiated in the synchronous processing process.

In the second embodiment of the invention, the two working portions H are processed by the insert molding section 243, and a single working portion H is processed by the press working section 241 and the shearing section 245. It is understood, however, that the invention is not limited to such a particular construction, but also includes cases where the number of working portions H to be processed in the insert molding section 243 is greater than the number of working portions H to be processed in the press working section 241 and the shearing section 245.

In the above-mentioned second embodiment, the stationary die 233 is actuated by means of a hydraulic cylinder. It is noted, however, that the stationary die 233 may be actuated by means of another type of drive source, such as an electric motor, for example.

In the above-mentioned second embodiment, the metal sheet 1 is fed by one pitch. It is noted, however, that the metal sheet 1 may be fed, for example, by 2 (two), 3 (three) or 4 (four) pitches, which is equal to or greater than 1 (one) pitch It is also noted that 2 pitches and 1 pitch may be combiningly used.

In accordance with the invention, it is possible for molded articles to be efficiently produced, so that manufacturing costs may be significantly reduced.

Increase in size of the apparatus for producing a molded article may be prevented, and molded article may be produced in a short time.

Damage to a molded article may be prevented, since the stationary die is moved to a position in which it is not in contact with the molded article.

I claim:
1. An apparatus for producing a molded article, comprising:
   a sheet feeding means for intermittently conveying a continuous sheet of material along a travel path;
   a press working station located downstream of said sheet feeding means along said travel path, wherein said press working station includes a lower plate and an upper plate facing one other from opposite sides of said travel path;
   a insert molding station located downstream of said press working station along said travel path, wherein said insert molding station includes a lower die and an upper die facing one another from opposite sides of said travel path, and wherein said lower die has a recess therein facing said upper die such that when said upper die is moved into contact with said lower die said recess is covered by a surface of said upper die whereby a closed cavity is formed;
   a shearing station located downstream of said insert molding station along said travel path, wherein said shearing station includes a die plate and a punch plate facing one another from opposite sides of travel path;
   a movable base to which each of said upper plate, said upper die and said punch plate are mounted, such that said upper die, said upper plate and said punch plate move in unison upon movement of said movable base toward and away from said lower plate, said lower die and said die plate;
   a plurality of lifter pins provided in each of said lower plate, said lower die and said die plate, wherein each of said lifter pins is movable synchronously with each other of said lifter pins from a retracted position in which each said lifter pin is located completely within its respective lower plate, lower die and die plate, to an extended position in which each said lifter pin extends from a surface of its respective lower plate, lower die and die plate;
   a drive means for moving said lower die towards said upper die; and
   a push-up pin provided in said lower die, wherein said push-up pin is movable from a retracted position in which said push-up pin is located completely within said lower die to an extended position in which said push-up pin extends into said recess;
   wherein said sheet feeding means intermittently conveys a continuous sheet of material along the travel path into the press working station, the molding station and the shearing station such that the sheet of material becomes supported by the lifter pins when the lifter pins are each in their extended positions, then the movable base is moved downwardly such that the upper plate, the upper die and the punch plate move into contact with an upper surface of the sheet of material and, a lower surface of the sheet of material is moved into contact against the lower plate, the lower die and die plate, while the lifter pins each move into their retracted positions, whereby in the press working station a selected portion of material is removed from the sheet of material and another portion of material is deformed through cooperation between the upper plate and the lower plate, in the molding station liquid resin is forced into the cavity and then solidified around portions of the sheet material that have been worked in the press working station, and in the shearing station the punch plate and the die plate cooperate with each other and shear from the sheet of material and article comprising the solidified resin and the portions of material to which it adheres, and wherein at the molding station, after the resin has solidified, the movable base is moved upwardly away form the sheet of material, then the drive means moves the lower die relative to the lower plate and die plate towards the upper die, and then the push-up pin moves from its retracted position to its expanded position such that the solidified resin becomes removed from the recess.

2. The apparatus of claim 1, and further comprising elevator means for moving said sheet feeding means upwardly and downwardly relative to said movable base.

3. The apparatus of claim 1 wherein, said lower die has a plurality of said recesses aligned in series which each cooperate with said upper die to form a plurality of said cavities, whereby said liquid resin can be charged into each of said cavities simultaneously.

4. The apparatus of claim 2 wherein, said lower die has a plurality of said recesses aligned in series which each cooperate with said upper die to form a plurality of said cavities, whereby said liquid resin can be charged into each of said cavities simultaneously.

* * * * *